US010994464B1

(12) United States Patent
Whipple et al.

(10) Patent No.: US 10,994,464 B1
(45) Date of Patent: *May 4, 2021

(54) METHOD AND SYSTEM FOR FORMING A SELF-SEALING VOLUME WITH AN AQUEOUS POLYURETHANE DISPERSION LAYER

(71) Applicant: ROBERTSON FUEL SYSTEMS, L.L.C., Tempe, AZ (US)

(72) Inventors: Matthew Whipple, Tempe, AZ (US); Davis Lee, Tempe, AZ (US)

(73) Assignee: ROBERTSON FUEL SYSTEMS, L.L.C., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/666,266

(22) Filed: Oct. 28, 2019

Related U.S. Application Data

(62) Division of application No. 14/821,653, filed on Aug. 7, 2015, now Pat. No. 10,471,676.

(51) Int. Cl.
*B29C 49/02* (2006.01)
*B29C 49/00* (2006.01)

(52) U.S. Cl.
CPC ................. *B29C 49/0005* (2013.01)

(58) Field of Classification Search
CPC .......... B29C 2049/026; B29C 49/0005; B29C 49/02; B29C 49/22; B29C 49/4273; B29C 49/62
USPC ........................................................ 264/516
See application file for complete search history.

(56) References Cited

U.S. PATENT DOCUMENTS

| 2,439,366 | A | 4/1948 | McLaughlin |
| 2,440,965 | A | 5/1948 | Merill et al. |
| 2,446,811 | A | 8/1948 | Crawford |
| 2,446,815 | A | 8/1948 | Davies et al. |
| 2,497,123 | A | 2/1950 | Frolich |
| 2,626,882 | A | 1/1953 | Gerke |
| 2,657,151 | A | 10/1953 | Gensel et al. |
| 2,687,976 | A | 8/1954 | Gerke |

(Continued)

FOREIGN PATENT DOCUMENTS

WO   WO1992-011186 A1   7/1992

*Primary Examiner* — Jeffrey M Wollschlager
*Assistant Examiner* — Xue H Liu
(74) *Attorney, Agent, or Firm* — Smith Tempel; Steven P. Wigmore

(57) ABSTRACT

A fabric coated or impregnated with an elastomeric material may include a polyurethane dispersion layer combined with a sealant. The fabric may be applied in such a fashion so as to enable the elimination of solvent or fluid that is associated with the elastomer. The polyurethane dispersion layer generally comprises an elastomeric material dispersed or dissolved in a liquid medium, such as, but not limited to, water. At the same time, the integrity of the elastomeric composite which is formed from the dispersion and sealant layers may be maintained in order to minimize the presence of air voids and pockets. It has thus been realized that in doing so the performance of the self-sealing volume is dramatically improved. This method of construction usually may be accomplished without significantly adding to the weight or thickness of the volume and without affecting the outer dimension of the self-sealing volume.

7 Claims, 23 Drawing Sheets

(56) References Cited

U.S. PATENT DOCUMENTS

| | | |
|---|---|---|
| 2,687,977 A | 8/1954 | Gerke |
| 2,802,763 A | 8/1957 | Freedlander |
| 2,987,977 A | 6/1961 | Bretthauer et al. |
| 2,992,957 A | 7/1961 | Maxey |
| 3,068,132 A | 12/1962 | Warburton |
| 3,449,189 A | 6/1969 | Hatch |
| 3,506,224 A | 4/1970 | Harr et al. |
| 3,509,016 A | 4/1970 | Wickersham, Jr. et al. |
| 3,526,580 A | 9/1970 | Taylor et al. |
| 3,563,846 A | 2/1971 | Harr |
| 3,577,314 A | 5/1971 | Evans |
| 3,587,914 A | 6/1971 | Jennings et al. |
| 3,664,904 A | 5/1972 | Cook |
| 3,692,742 A | 9/1972 | Underwood |
| 3,772,071 A | 11/1973 | Harr |
| 3,779,420 A | 12/1973 | Knaus |
| 3,787,279 A | 1/1974 | Winchester |
| 3,801,425 A | 4/1974 | Cook |
| 3,916,060 A | 10/1975 | Fish et al. |
| 3,951,190 A | 4/1976 | Suter et al. |
| 4,050,358 A | 9/1977 | Humberstone et al. |
| 4,125,526 A | 11/1978 | McCready |
| 4,146,667 A | 3/1979 | Stannard |
| 4,149,921 A | 4/1979 | Stannard |
| 4,247,678 A | 1/1981 | Chung et al. |
| 4,326,573 A | 4/1982 | Brown et al. |
| 4,368,086 A | 1/1983 | Villemain |
| 4,434,021 A | 2/1984 | Robinson et al. |
| 4,434,201 A | 2/1984 | Humphreys |
| 4,435,240 A | 3/1984 | Knaus et al. |
| 4,487,913 A | 12/1984 | Chung et al. |
| 4,565,729 A | 1/1986 | Liggett et al. |
| 4,622,091 A | 11/1986 | Letterman et al. |
| 4,668,535 A | 5/1987 | Liggett et al. |
| 4,689,385 A | 8/1987 | MacPhee et al. |
| 4,910,265 A | 3/1990 | Matsumura et al. |
| 5,001,208 A | 3/1991 | Ross et al. |
| 5,045,386 A | 9/1991 | Stan et al. |
| 5,047,495 A | 9/1991 | Kolycheck |
| 5,122,318 A | 6/1992 | Bonet |
| 5,194,212 A | 3/1993 | Bonnett et al. |
| 5,242,651 A | 9/1993 | Brayden |
| 5,298,303 A | 3/1994 | Kerr et al. |
| 5,366,684 A | 11/1994 | Corneau et al. |
| 5,387,455 A | 2/1995 | Horsch |
| 5,499,743 A | 3/1996 | Blumenkron |
| 5,725,940 A | 3/1998 | Sakai et al. |
| 5,928,745 A | 7/1999 | Wood et al. |
| 5,961,764 A | 10/1999 | Sydow et al. |
| 6,090,465 A | 7/2000 | Steele et al. |
| 6,429,157 B1 | 8/2002 | Kishi et al. |
| 6,915,861 B2 | 7/2005 | Goodworth et al. |
| 7,213,970 B1 | 5/2007 | Reicin et al. |
| 7,259,115 B2 | 8/2007 | Panse |
| 7,288,307 B2 | 10/2007 | Bhatnagar et al. |
| 7,824,770 B2 | 11/2010 | Honma et al. |
| 7,858,016 B2 | 12/2010 | Van Schaftingen et al. |
| 7,861,884 B2 | 1/2011 | Childress et al. |
| 9,802,476 B1 * | 10/2017 | Whipple ............... B60K 15/03 |
| 2003/0224235 A1 | 12/2003 | Park et al. |
| 2004/0040640 A1 | 3/2004 | Bordes |
| 2005/0025929 A1 | 2/2005 | Smith et al. |
| 2006/0165932 A1 | 7/2006 | Hromadkova et al. |
| 2006/0234097 A1 | 10/2006 | Boehm et al. |
| 2006/0266472 A1 | 11/2006 | Kipp et al. |

* cited by examiner

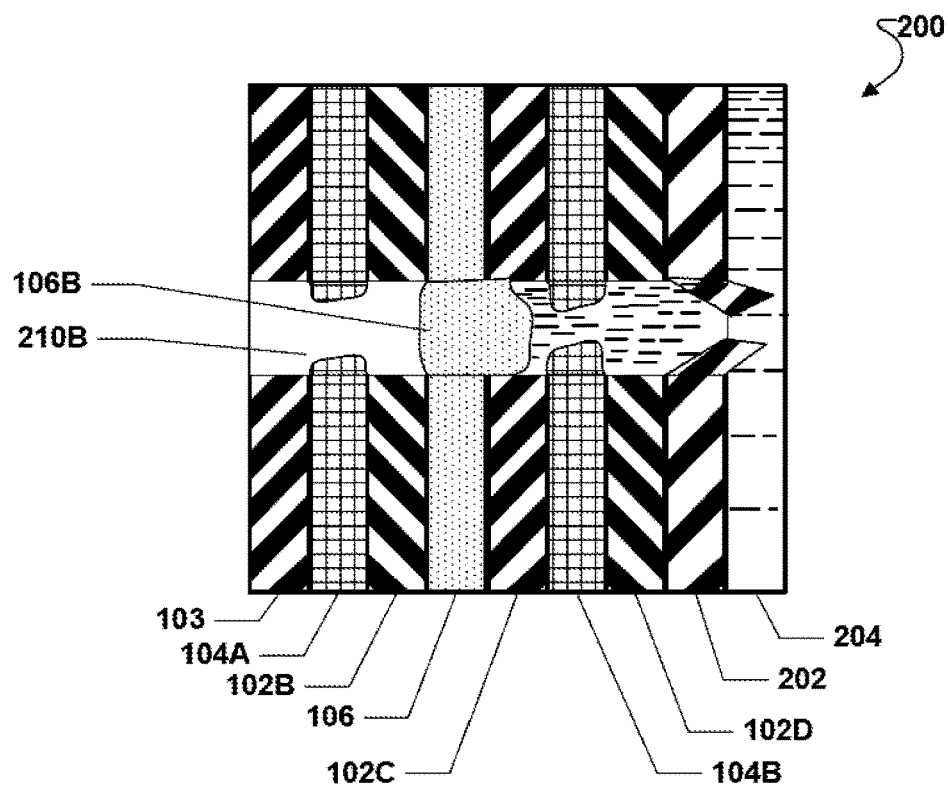
FIG. 2F
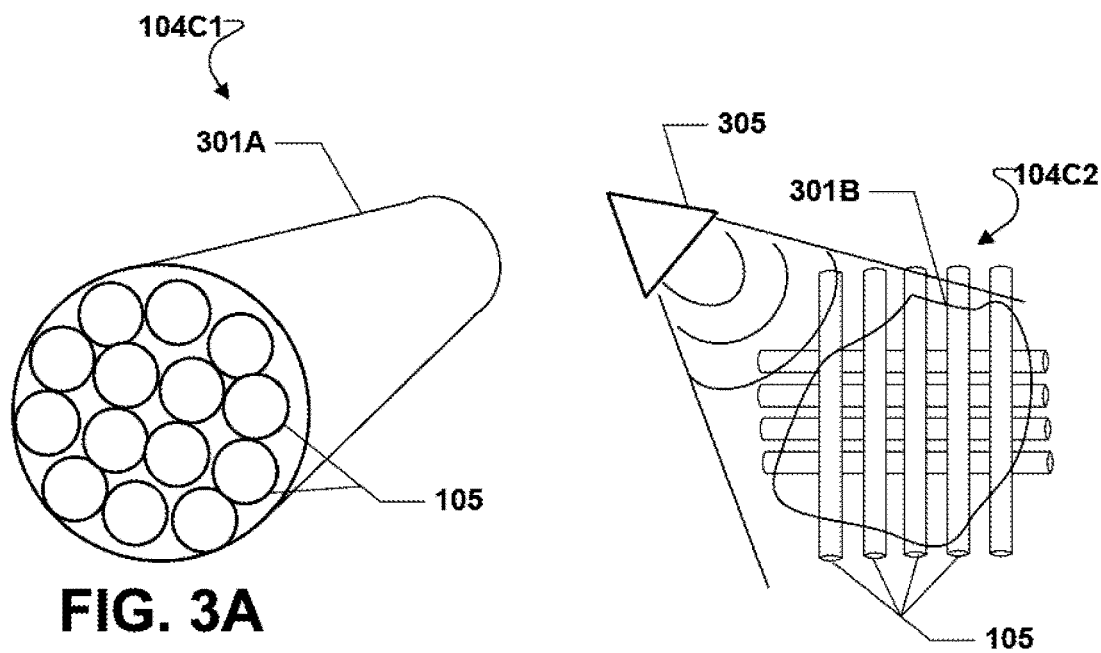
FIG. 3A
FIG. 3B

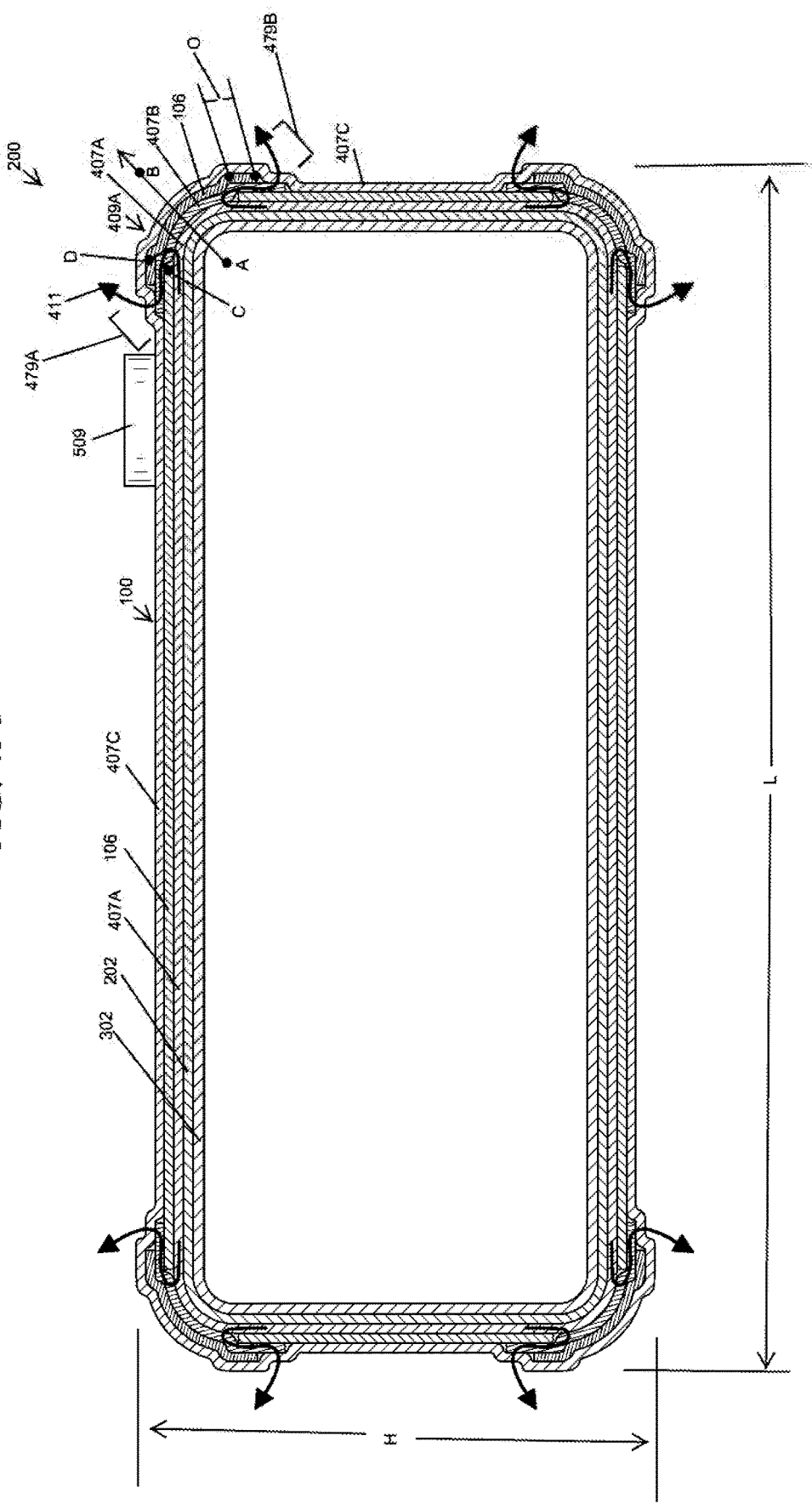
FIG. 4F1

FIG. 4F2

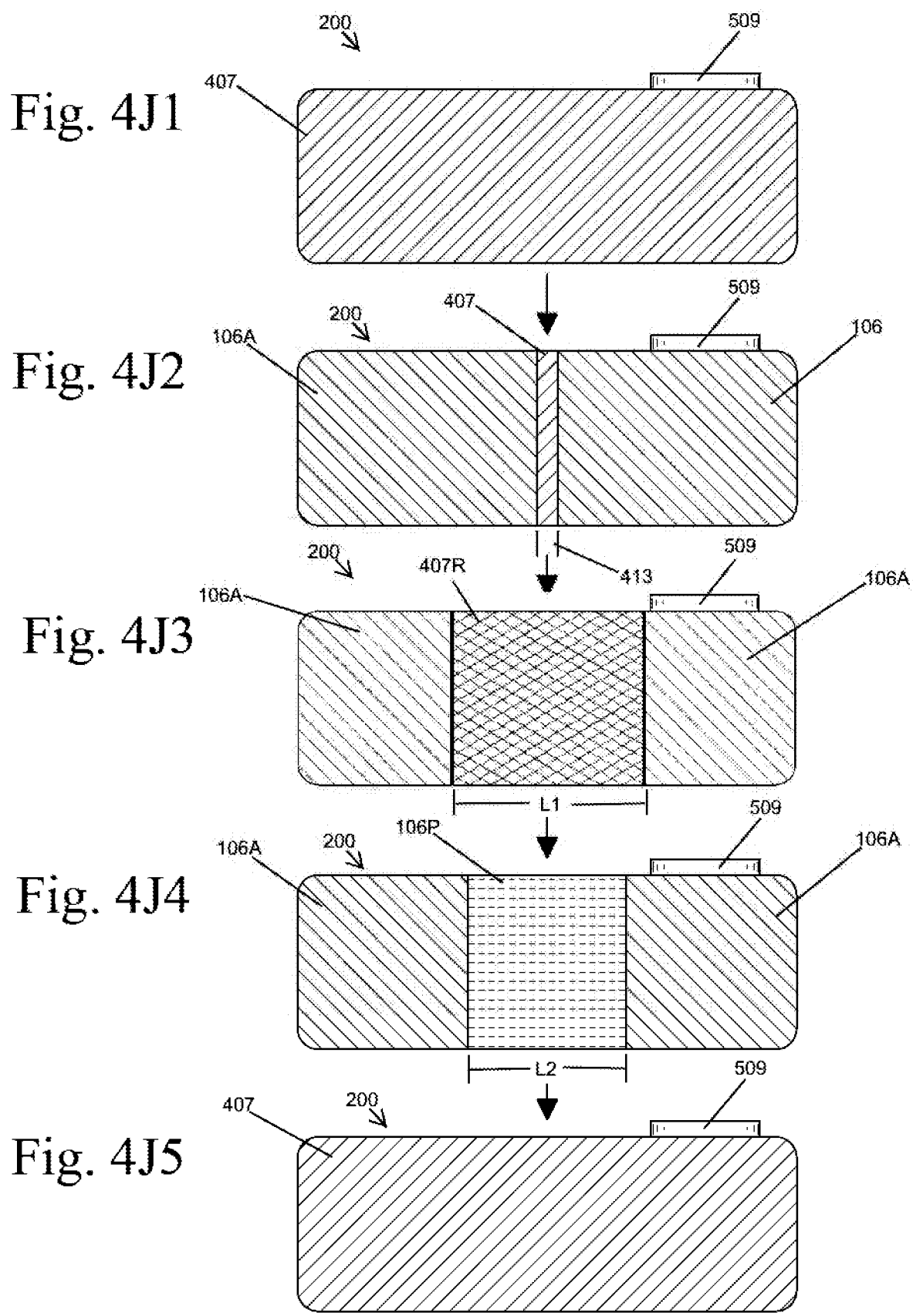

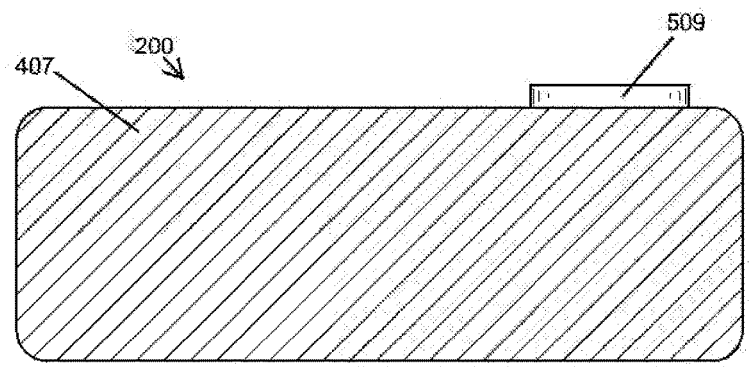
Fig. 4K1
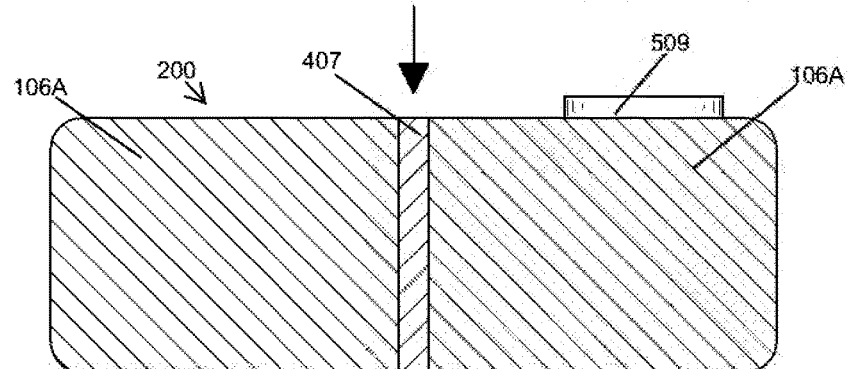
Fig. 4K2
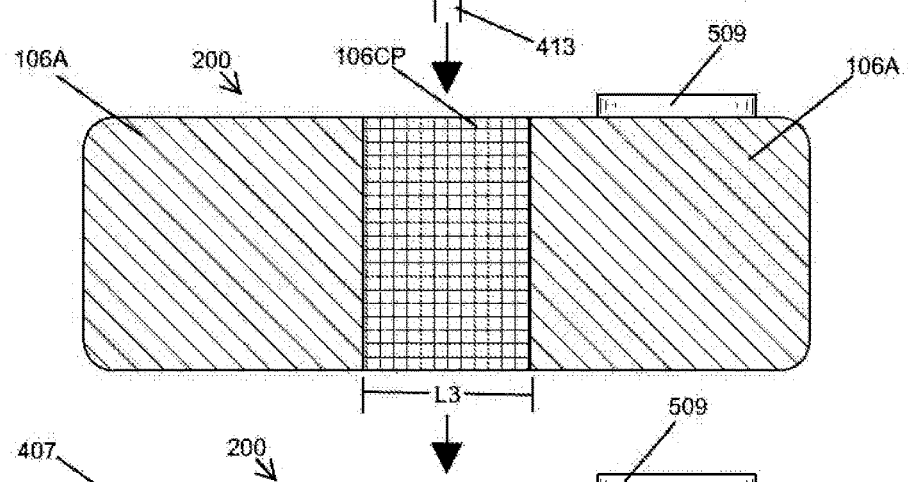
Fig. 4K3
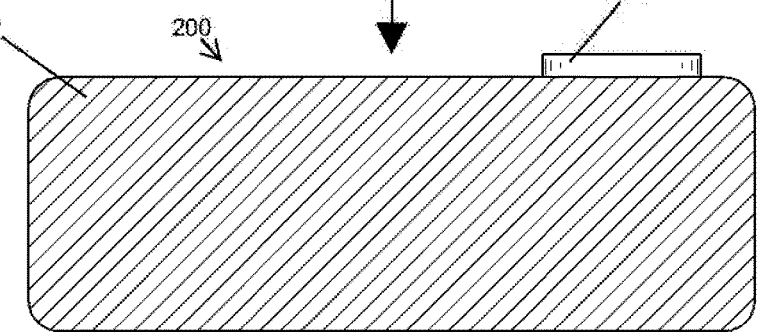
Fig. 4K4

Fig. 4K5
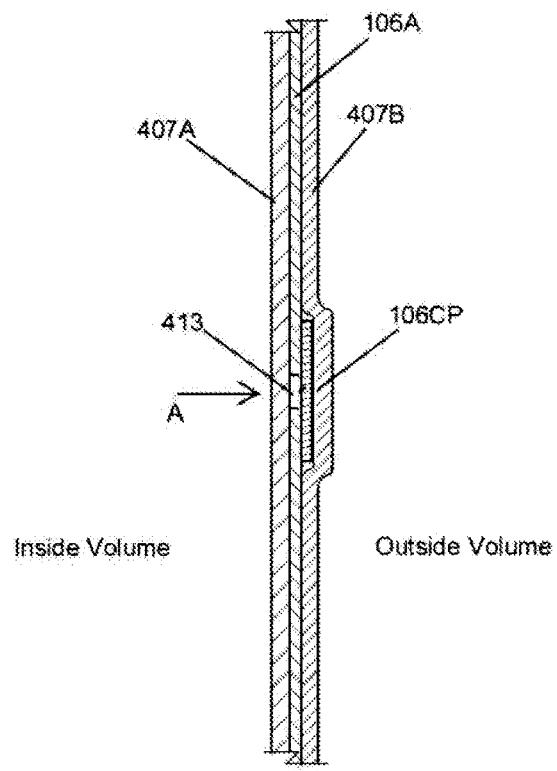
Inside Volume   Outside Volume
Fig. 4K6
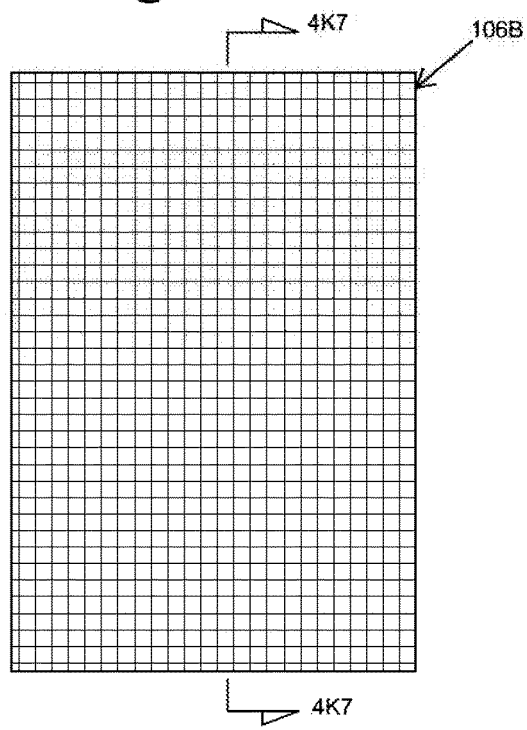
Fig. 4K7
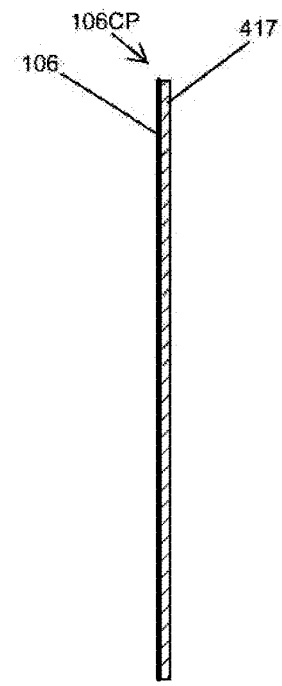

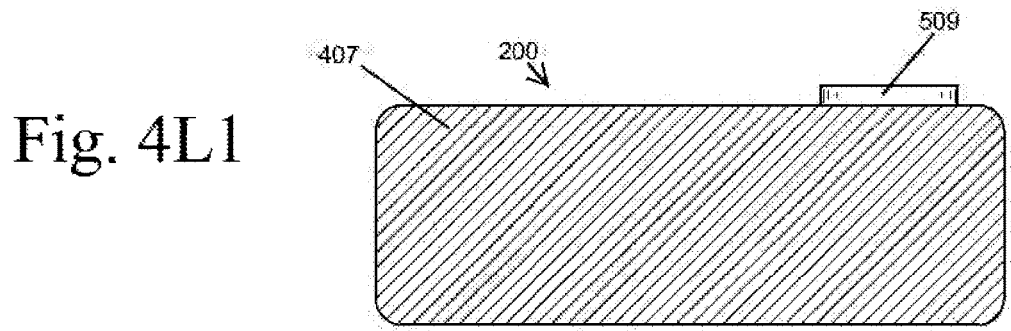
Fig. 4L1
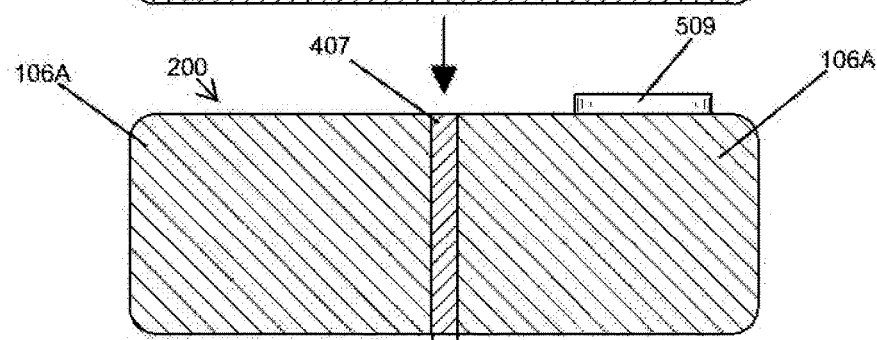
Fig. 4L2
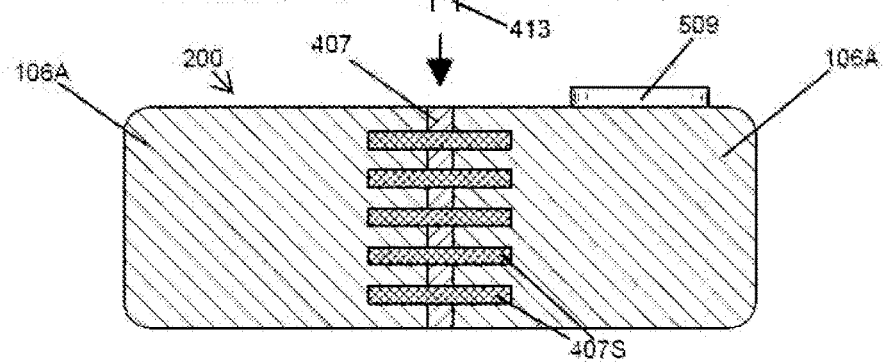
Fig. 4L3
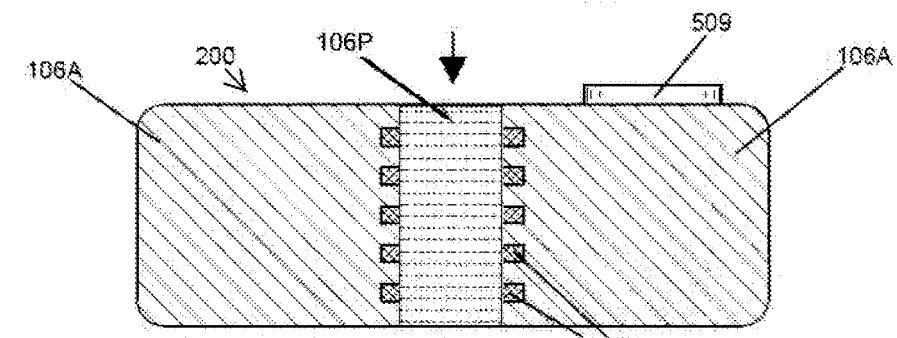
Fig. 4L4
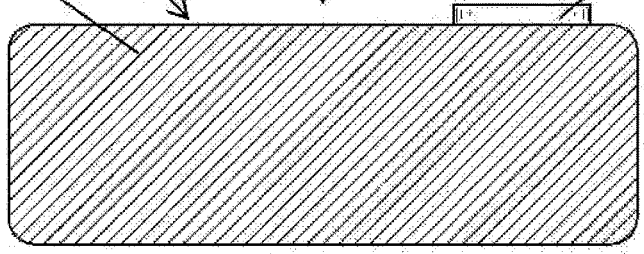
Fig. 4L5

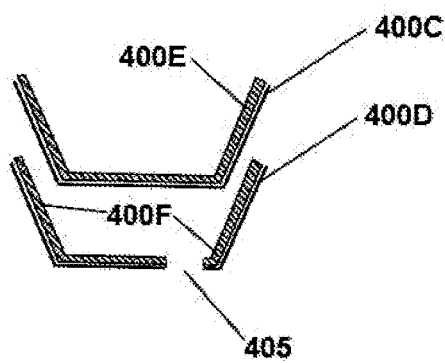
FIG. 7A1
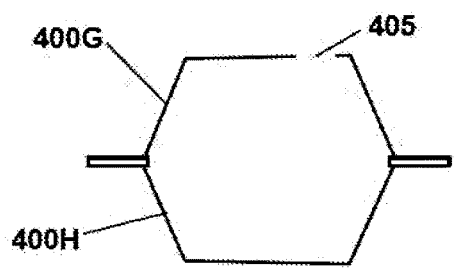
FIG. 7B1
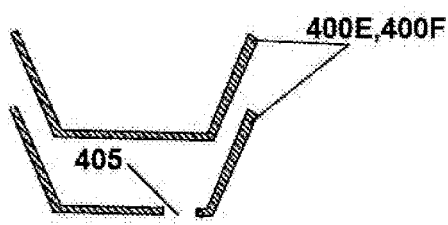
FIG. 7A2
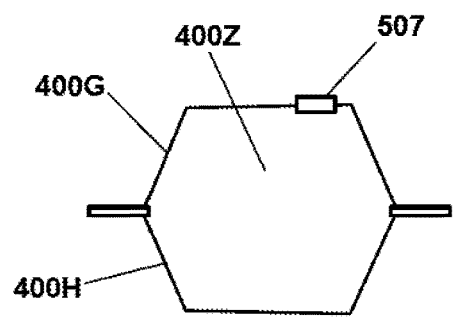
FIG. 7B2
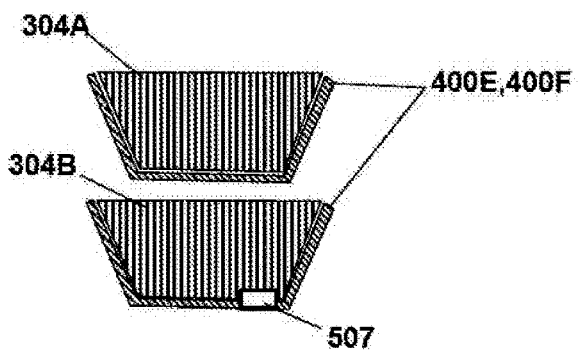
FIG. 7A3
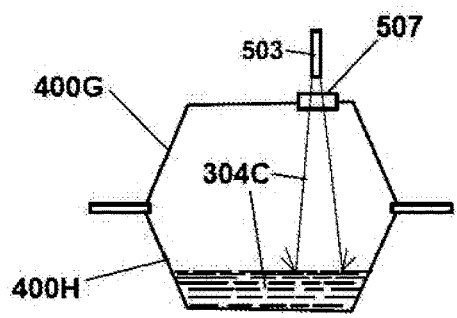
FIG. 7B3
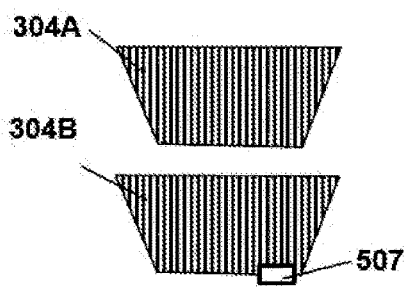
FIG. 7A4
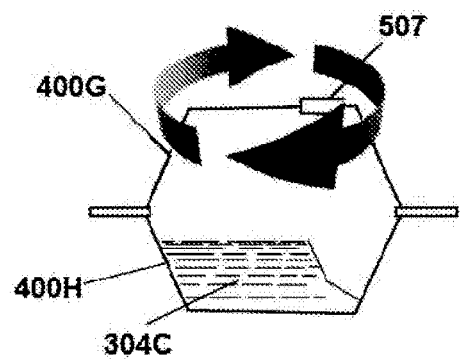
FIG. 7B4

METHOD AND SYSTEM FOR FORMING A SELF-SEALING VOLUME WITH AN AQUEOUS POLYURETHANE DISPERSION LAYER

DESCRIPTION OF THE RELATED ART

The present invention is related generally to the field of containers for materials, and more specifically related to the field of self-sealing fuel tanks. These tanks are frequently preferred in applications where fuel fire and explosion risks are high, as in military, armored and racing vehicles.

Self-sealing fuel tanks currently exist in the conventional art. One problem with these conventional self-sealing fuel tanks is that they are manufactured using labor intensive hand layup processes that require long cure times. Large numbers of self-sealing fuel tanks thus cannot be manufactured over a reasonable time period.

In addition, these conventional manufacturing techniques do not allow for precise control of the outer dimensions of self-sealing fuel tank, a problem where tight fits are required and maximum fuel capacity is desired. A closed molding process would allow for precise control of the outer dimensions of self-sealing fuel tank.

Alternative materials of manufacture can be used that do not require the labor intensity and long cure times but these materials typically result in composite that lacks flexibility, has increased weight or prevents the use of a closed molding process. Solvated elastomeric materials and elastomeric dispersions for example, while beneficial in that they are low viscosity and can therefore be easily applied, typically cannot be used because a closed mold inhibits the escape of high vapor pressure fluids such as water and solvent. It usually is not possible to control the evaporation of certain fluids of these materials during a closed molding process.

Accordingly, there is a need in the art for a method in forming self-sealing volumes that enables the use of elastomeric dispersions and solvated elastomers in a closed molding process where it is possible to control the evaporation of fluids and precisely control the fuel tank outer dimensions.

BRIEF SUMMARY OF THE INVENTION

It has been discovered that a fabric coated or impregnated with an elastomeric material (referred to later as an elastomeric material and fabric), that may include a polyurethane dispersion layer combined with a sealant may be applied in such a fashion so as to enable the elimination of solvent or fluid that is associated with the elastomer. The polyurethane dispersion layer generally comprises an elastomeric material dispersed or dissolved in a liquid medium, such as, but not limited to, water. At the same time, the integrity of the elastomeric composite which is formed from the dispersion and sealant layers may be maintained in order to minimize the presence of air voids and pockets. It has thus been realized that in doing so the performance of the self-sealing volume is dramatically improved. This method of construction usually may be accomplished without significantly adding to the weight or thickness of the volume and without affecting the outer dimension of the self-sealing volume.

Thus, a method for forming a self-sealing volume is described. The system includes an elastomeric composite structure comprising polyurethane dispersion layer and at least one layer of an elastomer impregnated fabric. The structure further may include at least one layer of a fabric, and at least one sealing layer. A fuel impermeable inner liner may be positioned in an inner region relative to the other layers.

The fabric may comprise fibers made from nylon, polyester, polyethylene and polypropylene materials. The fabric and self-sealing layers are positioned relative to each other so as to create a path for solvent or water to escape when the volume is heated and pressurized to consolidate layers.

The at least one sealing layer may comprise at least one of an unvulcanized or partially vulcanized natural rubber (NR), a polyisoprene (IR), a styrene butadiene (SBR), or a blend of these materials. In other exemplary embodiments, the sealing layer may comprise polyurethane. In other exemplary embodiments, the sealing layer may comprise fully vulcanized (>1% sulfur) rubber. Other alternative materials for the sealing layer may include, but are not limited to, aliphatic polyurethanes. These materials can also be manufactured to include a calendered scrim material.

Another inventive aspect of the method and system is that the preform release layer is inflated during curing of the elastomeric material layer. With this inflation of the preform release layer, the elastomeric composite layer conforms to the exact dimensions of the mold that holds the preform and the elastomeric composite sandwiched there between. At the same time solvent or water and air are driven out of the composite structure. This process yields a dimensionally correct/precisely built self-sealing volume.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

FIG. 2F is a cross-sectional view of the wall of FIG. 2E in which the fluid continues to react with the sealing layer causing the sealing layer to further expand into the close the volume containing the fluid.

FIG. 3A is a diagram illustrating fibers receiving a polyurethane coating.

FIG. 3B is a diagram illustrating a fabric receiving a polyurethane coating.

FIG. 4F1 is a cross-sectional view of a self-sealing volume in the form of a fuel tank illustrating the individual composite layers along with paths of air escape according to one exemplary embodiment.

FIG. 4F2 is a cross-sectional view of an elastomeric material and fabric that is depicted in FIG. 4F1.

FIG. 4J1 is a side view of an intermediate self-sealing volume illustrating an inner layer of the elastomeric material and fabric layer.

FIG. 4J2 is a side view of an intermediate self-sealing volume illustrating the sealant applied with a gap over the elastomeric material and fabric of FIG. 4J1.

FIG. 4J3 is a side view of an intermediate self-sealing volume illustrating a breather fabric applied over the gap illustrated in FIG. 4J2.

FIG. 4J4 is a side view of an intermediate self-sealing volume illustrating a sealant patch applied over the gap and breather fabric of FIG. 4J3.

FIG. 4J5 is a side view of an intermediate self-sealing volume illustrating an outer layer of the elastomeric material and fabric applied over the sealant patch and sealant of FIG. 4J4.

FIG. 4K1 is a side view of an intermediate self-sealing volume illustrating an inner layer of the elastomeric material and fabric layer.

FIG. 4K2 is a side view of an intermediate self-sealing volume illustrating the sealant applied with a gap over the elastomeric material and fabric of FIG. 4K1.

FIG. 4K3 is a side view of an intermediate self-sealing volume illustrating a calendared sealant patch applied over the gap and sealant of FIG. 4K2.

FIG. 4K4 is a side view of an intermediate self-sealing volume illustrating an outer layer of the elastomeric material and fabric applied over the calendared sealant patch and sealant of FIG. 4K3.

FIG. 4K5 is a cross-sectional top, view of the calendared sealant patch embodiment of FIG. 4K4.

FIG. 4K6 is a front view of the calendared sealant patch of FIG. 4K3 illustrated alone.

FIG. 4K7 is a side view of the calendared sealant patch illustrated in FIG. 4K6 illustrated alone.

FIG. 4L1 is a side view of an intermediate self-sealing volume illustrating an inner layer of the elastomeric material and fabric layer.

FIG. 4L2 is a side view of an intermediate self-sealing volume illustrating the sealant applied with a gap over the elastomeric material and fabric of FIG. 4L1.

FIG. 4L3 is a side view of an intermediate self-sealing volume illustrating a breather fabric strips applied over the gap illustrated in FIG. 4L2.

FIG. 4L4 is a side view of an intermediate self-sealing volume illustrating a sealant patch applied over the gap and breather fabric strips of FIG. 4L3.

FIG. 4L5 is a side view of an intermediate self-sealing volume illustrating an outer layer of the elastomeric material and fabric applied over the sealant patch and sealant of FIG. 4L4.

FIG. 6 a flowchart illustrating an optional routine or submethod for creating a polyurethane elastomer according to an exemplary embodiment.

FIG. 7A1 is a cross-sectional view of a device for forming flexible molds according to an exemplary embodiment.

FIG. 7A2 is a cross-sectional view of the flexible molds formed from the device of FIG. 7A1 according to an exemplary embodiment.

FIG. 7A3 is a cross-sectional view of preform material positioned within the flexible molds of FIG. 7A2 according to an exemplary embodiment.

FIG. 7A4 is a cross-sectional view of the two halves of a gas-permeable, solid preform generated from the flexible molds of FIG. 7A3 according to an exemplary embodiment.

FIG. 7A5 is a cross-sectional view of the two halves of the gas-permeable, solid preform put together according to an exemplary embodiment.

FIG. 7A6 is a cross-sectional view of the two halves of the gas-permeable, solid preform after apertures or holes have been created within the preform according to an exemplary embodiment.

FIG. 7B1 is a cross-sectional view of a solid mold for forming a gas-impermeable, hollow preform according to an exemplary embodiment.

FIG. 7B2 is a cross-sectional view of the solid mold of FIG. 7B1 with a fixture attached to a side of the solid mold having an aperture according to an exemplary embodiment.

FIG. 7B3 is a cross-sectional view of the solid mold in which a liquid state of the preform material is poured into the solid mold via the fixture according to an exemplary embodiment.

FIG. 7B4 is a cross-sectional view of the solid mold containing the preform liquid material while the solid mold is being rotated according to an exemplary embodiment.

FIG. 7B5 is a cross-sectional view of the solid mold being opened after curing of the preform liquid material into an gas-impermeable, hollow preform according to an exemplary embodiment.

FIG. 7B6 is a cross-sectional view of the gas-impermeable, hollow preform after apertures or holes have been created within the preform according to an exemplary embodiment.

DETAILED DESCRIPTION OF THE INVENTION

The word "exemplary" is used herein to mean "serving as an example, instance, or illustration." Any aspect described herein as "exemplary" is not necessarily to be construed as preferred or advantageous over other aspects.

Figure 1A:
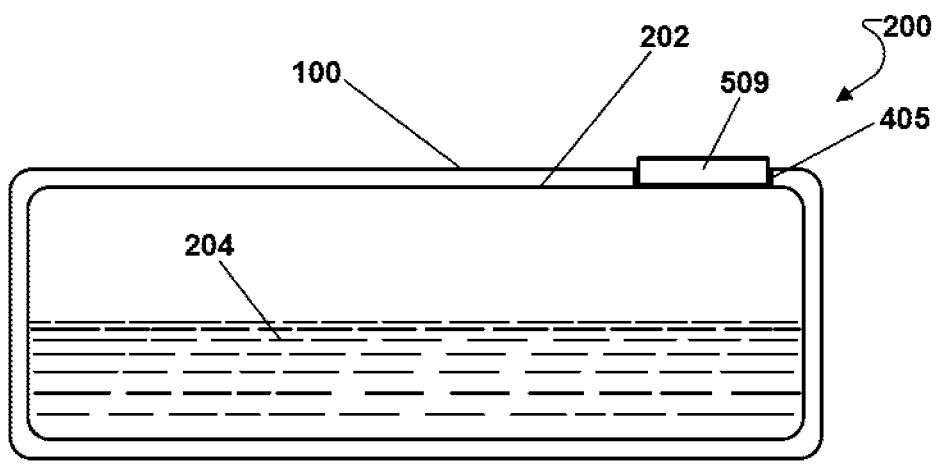
FIG. 1A is a cross-sectional view of a self-sealing volume in the form of a fuel tank according to one exemplary embodiment.

FIG. 1A is a cross-sectional view of a self-sealing volume or wall system 200 in the form of a fuel tank according to an exemplary embodiment. The wall system 200 comprises a wall 100 and a liner 202 which will be described in more detail below. The wall system 200 may contain a fluid 204, such as, but not limited to, a hydrocarbon fuel. The wall system 200 may further comprise a nut ring 509 containing an access port 405 which will be described below in connection with FIGS. 4C-4E. The nut ring 509 is fitted/mates with the metal fixture 507 (FIG. 7) as will be described below. The wall system 200 may comprise a composite of elastomeric material and fabric as described in further detail below. The composite of elastomeric material and fabric may include a self-healing layer for sealing after ballistic penetration.

Figure 1B:
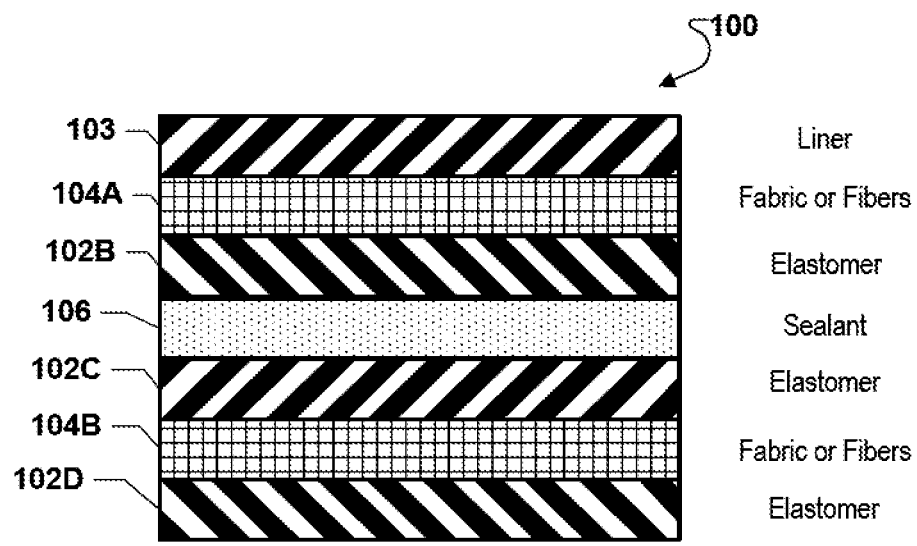
FIG. 1B is a cross-sectional view of a portion of a wall of a self-sealing volume according to one exemplary embodiment.

Referring now to FIG. 1B, this figure is a cross-sectional view of a portion of a wall 100 for forming the self-sealing volume or wall system 200 (of FIG. 1A) according to one exemplary embodiment. The wall 100 may comprise an elastomeric composite that includes a combination of layers such as, for example, a polyurethane dispersion layer 102, a fabric or fiber layer 104, and a sealant layer 106.

In the exemplary embodiment illustrated in FIG. 1B, the wall 100 may comprise a fuel resistant outer liner 103, a first fabric or fiber layer 104A, a second elastomeric material such as a polyurethane dispersion layer 102B, a sealant layer 106, a third elastomeric material such as a polyurethane dispersion layer 102C, a second fabric were fiber layer 104B, and a fourth elastomeric material such as a polyurethane dispersion layer 102D.

The fuel resistant outer liner 103 may comprise an aqueous anionic dispersion of a high molecular weight polyurethane, such as, but not limited to, a molecular weight of about 335,000.00. This dispersion comprises high molecular weight polyurethane dispersed or dissolved in a liquid medium, such as, but not limited to, water and is then cross-linked by incorporating a cross-linking polymer, such as a waster dispersible polyisocyanate, an organofunctional silane, a polyaziridine or a polycarbodiimide, in the polyurethane dispersion.

The fuel resistant outer liner 103 may be applied by brushing, troweling, or spraying, or other ways as understood by one of ordinary skill in the art. After the outer liner 103 has been sufficiently applied onto the fabric or fiber layer 104, then the coating is ready to be activated and cured.

The polyurethane dispersion layers 102 may comprise an aqueous anionic dispersion of a high molecular weight polyurethane, such as, but not limited to, a molecular weight of about 335,000.00. This means that the polyurethane dispersion layer 102 generally comprises high molecular weight polyurethane dispersed or dissolved in a liquid medium, such as, but not limited to, water. The polyurethane dispersion layers 102 are designed to dry and become somewhat tacky at room temperature, which is typically about 25.0° C. as understood by one of ordinary skill in the art. Further heating will drive off any water, causing the elastomer to coalesce and develop desired material properties for storing liquids, like fuels.

Other aqueous elastomeric dispersions may be used. Other aqueous elastomeric dispersions include, but are not limited to, Polychloroprene (Neoprene) latex, Styrene butadiene (SBR) latex, Acrylonitrile butadiene (NBR) latex, Chlorosulfonated polyethylene (Hypalon) latex, Ethylene propylene diene monomer (EPDM) latex, and the like. Solvated elastomers may also be used. Some solvated elastomers include, but are not limited to Polychloroprene (Neoprene), Styrene butadiene (SBR), Acrylonitrile butadiene (NBR), Chlorosulfonated polyethylene (Hypalon), Ethylene propylene diene monomer (EPDM), Polyvinylidene fluoride (FKM), Polysulfide, Hydrogenated nitrile butyl rubber (HNBR), and the like.

A cross-linked elastomeric material may also be used in the dispersion layers 102. Such a material can be made by incorporating a cross-linking polymer, such as a waster dispersible polyisocyanate, an organofunctional silane, a polyaziridine or a polycarbodiimide, in the polyurethane dispersion. A cross-linked elastomeric material will usually improve the compression set and minimize plastic deformation at higher temperatures. As understood by one of ordinary skill in the art, compression set is the tendency of elastomers to undergo permanent deformation. It is the tendency of some elastomers to not recover in a completely elastic manner. An addition of a crosslinking water dispersible polyisocyanate such as described above may remedy this characteristic. This compression set property may be measured by ASTM D395. As understood by one of ordinary skill in the art plastic deformation at higher temperatures is the tendency of elastomers to permanently deform from their original shape when heated above the softening or melting temperature. The addition of a crosslinking water dispersible polyisocyanate such as described above may remedy this characteristic. The softening or melting temperature may be measured by ASTM D3418-03.

The polyurethane dispersion layers 102 may be applied by brushing, troweling, swabbing, dipping or spraying, or other ways as understood by one of ordinary skill in the art. After the polyurethane dispersion layer 102 has been sufficiently spread and incorporated into the fabric or fiber layer 104, then the elastomeric composite formed by layers 102 and 104 is ready to be activated and cured.

Debulking may also be used during the layup process and can be accomplished in a number of ways as understood by one of ordinary skill in the art. This debulking further consolidates the multiple layers to ensure the final composite can be installed into the cure mold as well as remove additional water or solvents which further decreases final cure cycle times. A sufficient temperature for debulking is generally between about 25.0° C. to about 120.0° C., and preferably between about 50.0° C. to about 100.0° C., and more preferably at about 83.0° C.

The polyurethane dispersion 102 is selected such that heat is required for activation and cure. Heat can be supplied from a conventional oven, an autoclave, a microwave oven or from a press, or alternative ways as understood by one of ordinary skill in the art. Once the liquid polyurethane dispersion layer 102 is applied onto the respective composite layers of a wall portion, the entire uncured structure may be placed into a three dimensional, dimensionally correct mold 400 (as will be described below in connection with FIG. 4). Curing is effected by heating the mold 400 to a sufficient temperature and for a sufficient time to cause the polyurethane dispersion to eliminate remaining water and to coalesce to form a solid polyurethane layer 102. A sufficient temperature is generally between about 83.0° C. to about 176.0° C., and preferably between about 100.0° C. to about 160.0° C., and more preferably at about 149.0° C. However, other temperatures may be used as understood by one of ordinary skill in the art and are within the scope of this disclosure. The time for coalescing is generally between about 5.0 minutes to about 120.0 minutes (min), and preferably between about 20.0 min to about 80.0 min, and more preferably for about 60.0 min. However, other times may be used as understood by one of ordinary skill in the art and are within the scope of this disclosure. As noted previously, the amount of pressure provided by the gaseous pressure source 403 is generally between about 2.0 psi to about 80.0 psi, and preferably between about 10.0 psi to about 40.0 psi, and more preferably at about 20.0 psi. However, other pressures may be used as understood by one of ordinary skill in the art and are within the scope of this disclosure.

In addition to polyurethane dispersions that are used as the elastomeric component of the composite, other elastomeric materials may also be used. Such elastomeric materials may include but are not limited to styrene butadiene rubber dispersions, nitrile butyl rubber dispersions, polychloroprene dispersions, polyurethane dispersions, polyurea dispersions, silicone dispersions, solvated polyureas, solvated polyurethanes, solvated nitrile butyl rubber, solvated polychloroprene, solvated polyvinylidene fluoride, silicones, polysulfides, polyurethane ureas, epoxy, polyester and other materials that can be applied at a low viscosity and then cured to form an intractable but flexible elastomer.

The fabric or fiber layer 104 may comprise polyamide, aramid, polyester, polypropylene or polyethylene fibers or coated fabrics of the same materials. The coating on the fibers or fabrics in layer 104 may comprise solvated or aliphatic polyurethane that is applied during the fiber or fabric manufacturing process. As understood by one of ordinary skill in the art, aliphatic is a general class of polyurethanes (excluding aromatic) which is typically easier to solvate than aromatic polyurethanes. The coating may also comprise a resorcinol formaldehyde (RFL) or an isocyanate. Further details of this coating for the fibers or fabric layer 104 are described below in connection with FIGS. 3A-3B As understood by one of ordinary skill in the art, polyamide is a class that includes NYLON and anisotropic aromatic polyamide (such as KEVLAR™). As understood by one of ordinary skill in the art, polyester is a class that includes polyethylene terephthalate and anisotropic aromatic polyesters. The fabric may comprise at least one of NYLON 6, NYLON 66, polyester, an anisotropic aromatic polyamide, or an anisotropic aromatic polyester from about 5.0 ounces per square yard ("oz/SY") to about 30.0 oz/SY. It is possible to use other fibers and fabrics with the elastomeric material layer 102, but polyamide and polyester fibers and fabrics are preferred due to their physical performance characteristics in ballistic and blast situations.

The sealant layer 106 typically is sandwiched between two elastomeric material layers 102 and two or more fabric or fiber layers 104 for reinforcement. Typical materials suitable for use as the sealant layer 106 may comprise unvulcanized, partially vulcanized and/or vulcanized natural rubber (NR). Other materials that may be used include polyisoprene (IR), styrene butadiene (SBR) and blends of SBR with NR or IR. In other exemplary embodiments, the sealant layer 106 may be unvulcanized. In other exemplary embodiments, the sealant layer 106 may comprise fully vulcanized (>1.0% sulfur) rubber. Other alternative materials for the sealant layer 106 may include, but are not limited to, aliphatic polyurethanes. The sealant layer 106 is illustrated in FIGS. 1B and 2A-2F as a solid layer. The thickness of the sealant layer can range from 0.015" to about 0.25", but preferably 0.12". In alternate exemplary embodiments, the sealant layer 106 may comprise multiple solid sealant layers that enclose a scrim fabric as understood by one of ordinary skill in the art. The thickness of the individual solid sealant layers that enclose the scrim fabric can range from 0.015 to about 0.125", but preferably 0.060". Other sizes and dimensions for the scrim fabric may be employed without departing from the scope of this disclosure. For example, the scrim fabric may comprise a weight of between about 2 oz to about 12 oz, but preferably about 7 oz. The scrim fabric may comprise polyimide, aramid, polyester, polypropylene or polyethylene fibers or coated fabrics of the same materials and include woven or non-woven materials.

While the thicknesses of each of the layers illustrated in FIG. 1 have been shown to be equivalent, one of ordinary skill in the art will recognize that the actual thicknesses of each layer may vary and may be adjusted depending upon the level of protection desired for a particular volume. Wall gauge design dimensions are usually driven by weight restrictions, ballistic needs and overall flexibility requirements. For example, the finished product for the self-sealing wall portion 100 typically has the following dimensions according to one illustrative embodiment: a first fabric or fiber layer 104A having a thickness of approximately 0.5 to approximately 2.0 mm; a second elastomeric material layer 102B having a thickness of approximately 0.1 to approximately 1.0 mm; a sealant layer 106 having a thickness of approximately 0.5 to approximately 13.0 mm; a third elastomeric material layer 102C having a thickness of approximately 0.1 to approximately 1.0 mm; a second fabric or fiber layer 104B having a thickness of approximately 0.5 to approximately 2.0 mm; and a fourth elastomeric material layer 102D having a thickness of approximately 0.1 to approximately 1.0 mm.

Figure 2A:
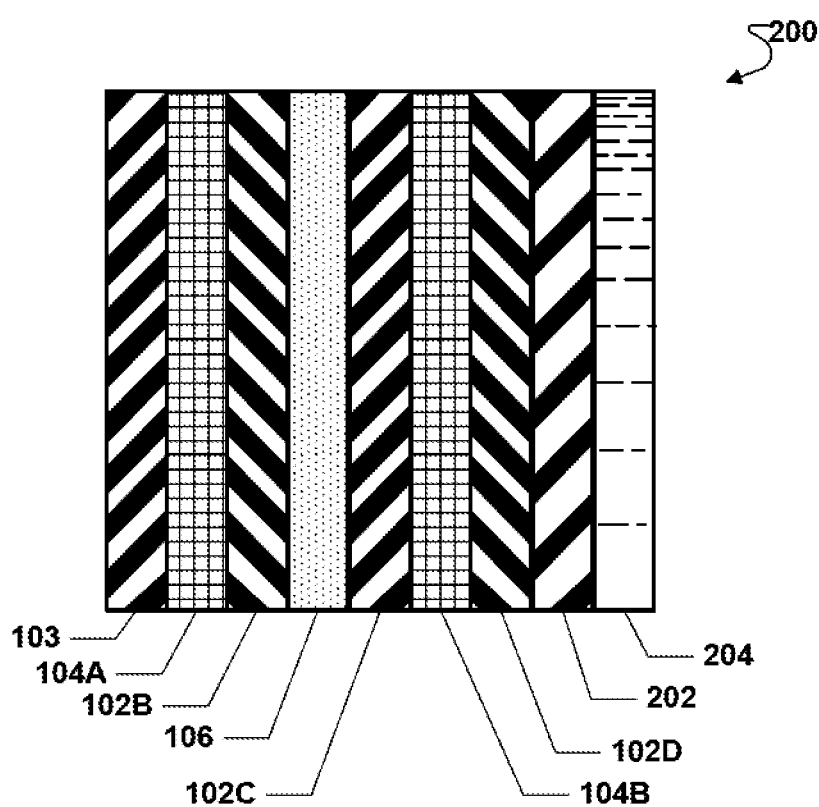
FIG. 2A is a cross-sectional view of an entire wall for a self-sealing volume according to the exemplary embodiment of FIG. 1.

Referring now to FIG. 2A, this figure is a cross-sectional view of an entire wall or wall system 200 for a self-sealing volume according to one exemplary embodiment. The wall system 200 comprises all of the layers of the wall 100 described above in connection with FIG. 1B, in addition to a liner layer 202 and the fluid 204.

The liner layer 202 may comprise any elastomeric material that will have a greater resistance to hydrocarbon fuel 204 than the elastomeric material 102. Exemplary materials include, but are not limited to, nitrile rubber, polyurethane, polysulfide and polyvinylidene fluoride, polyurea, polyvinylalchohol (PVA), Hydrogenated Nitrile Butadiene Rubber (HNBR), Epichlorohydrin rubber (ECO), or any fuel resistant elastomer. An optional barrier layer, described below, may also be used and positioned on the outside of the liner layer 202.

The fluid 204 may comprise a fuel, and particularly a hydrocarbon fuel 204, such as gasoline, diesel-based fuels, biofuels, and ethanol fuels used in military crafts such as airplanes, boats, helicopters, tanks, cars, jeeps, all-terrain-vehicles (ATVs), and other similar vehicles. The wall 100 provides a self-sealing barrier and protection for the liner layer 202 in order to contain the fluid 204 within the entire wall system 200.

Figure 2B:
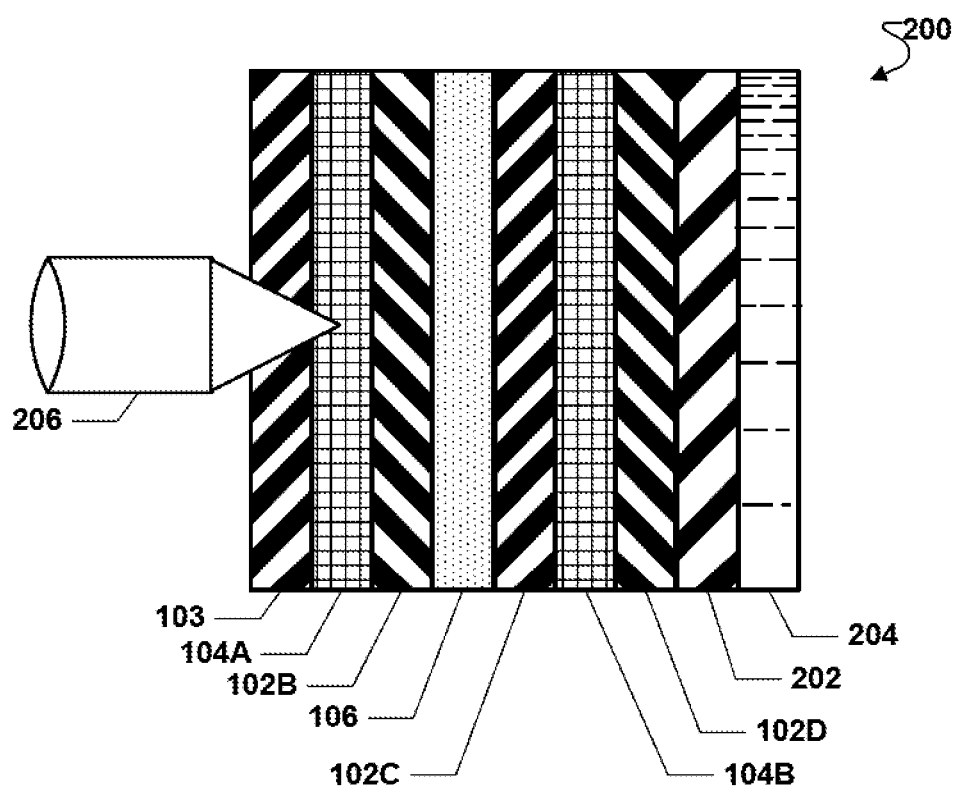
FIG. 2B is a cross-sectional view of the wall of FIG. 2A in which a projectile has begun to penetrate the wall entering from outside of the self-sealing volume towards the inside of the volume containing a fluid, such as fuel.

FIG. 2B is a cross-sectional view of the wall system 200 of FIG. 2A in which a projectile 206 has begun to penetrate the wall system 200 entering from outside of the self-sealing volume towards the inside of the volume containing a fluid 204, such as fuel. The projectile 206 may comprise any type of object that is launched from a gun or ballistic system, such as a bullet or fragment, and/or fragments from high velocity vehicle accidents. In the exemplary embodiment illustrated in FIG. 2B, the projectile 206 has already penetrated the first elastomeric material layer 102A and is starting to enter the first fabric or fiber layer 104A.

Figure 2C:
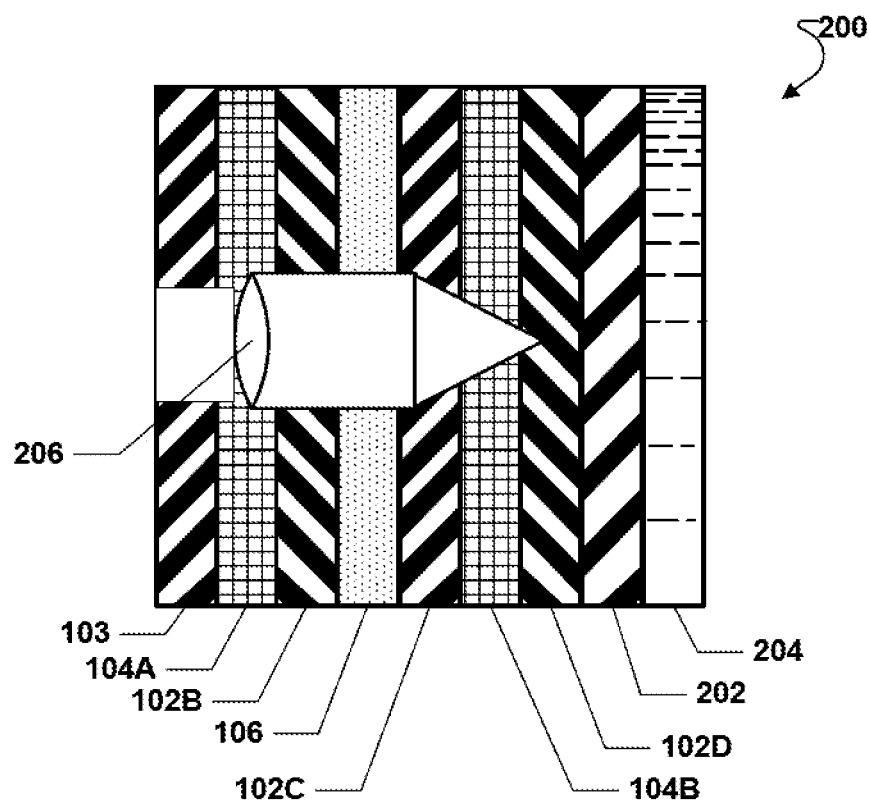
FIG. 2C is a cross-sectional view of the wall of FIG. 2B in which the projectile has continued to penetrate the wall from the outside of the self-sealing volume towards the inside of the volume containing a fluid, such as fuel.

FIG. 2C is a cross-sectional view of the wall system 200 of FIG. 2B in which the projectile 206 has continued to penetrate the wall system 200 from the outside of the self-sealing volume towards the inside of the volume containing a fluid 204, such as fuel. In this exemplary embodiment, the projectile 206 has penetrated through the first elastomeric material layer 102A, the first fabric or fiber layer 104A, the second elastomeric material layer 102B, the sealant layer 106, the third elastomeric material layer 102C, the second fabric or fiber layer 104B, and has started to enter the fourth elastomeric material layer 102D.

Figure 2D:
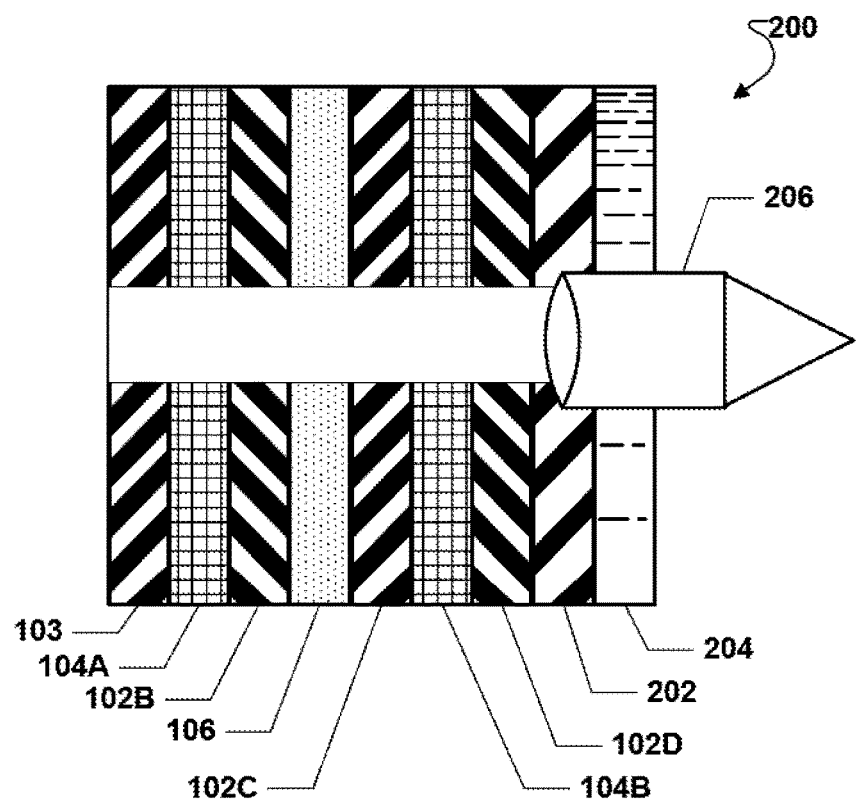
FIG. 2D is a cross-sectional view of the wall of FIG. 2C in which the projectile has continued to penetrate the wall from outside of the self-sealing volume towards the inside of the volume containing a fluid, such as fuel.

FIG. 2D is a cross-sectional view of the wall system 200 of FIG. 2C in which the projectile 206 has continued to penetrate the wall system 200 from outside of the self-sealing volume towards the inside of the volume containing a fluid 204, such as fuel. In this exemplary embodiment, the projectile 206 has penetrated through all the layers of the wall system 200 including the liner layer 202 and has entered the volume containing the fluid 204 itself. Specifically, the projectile 206 has penetrated through all four layers of the elastomeric material layers 102, the two fiber or fabric layers 104, the single sealant layer 106, and the liner layer 202.

Figure 2E:
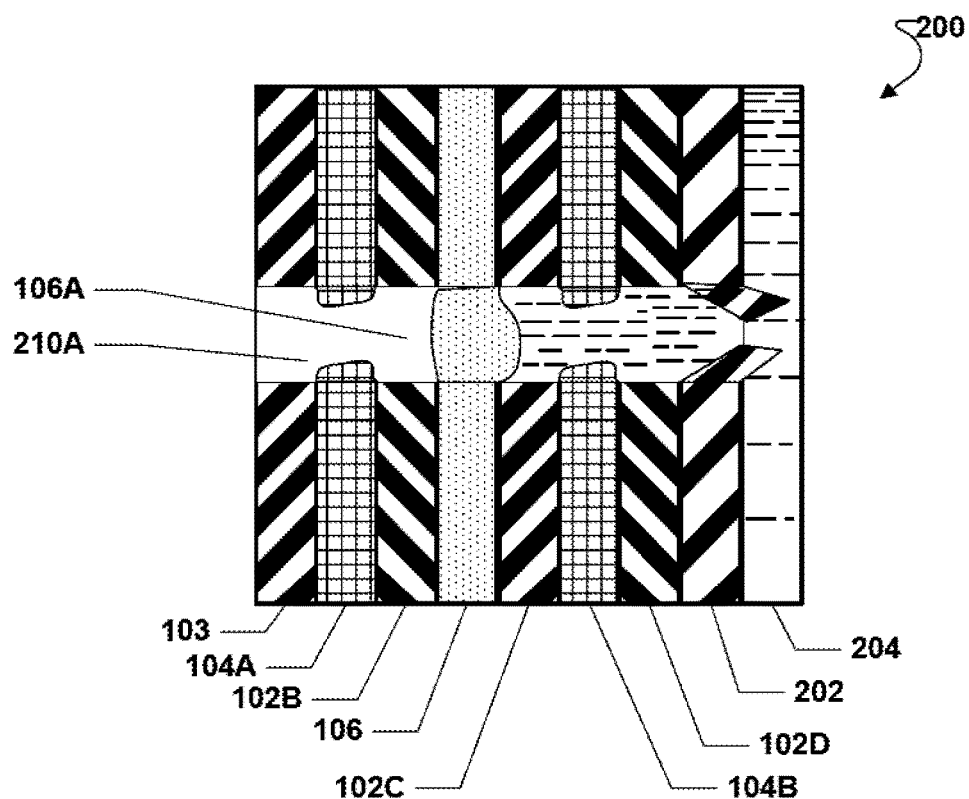
FIG. 2E is a cross-sectional view of the wall of FIG. 2D in which the projectile has completely penetrated the wall and has entered into the volume containing the fluid, such as fuel, and allowing the fluid to react with the sealing layer.

FIG. 2E is a cross-sectional view of the wall system 200 of FIG. 2D in which the projectile has completely penetrated the wall system 200 and has entered into the volume containing the fluid 204, such as fuel, thus allowing the fluid 204 to react with the sealant layer 106. In this exemplary embodiment, the fluid 204 which may comprise a fuel such as a hydrocarbon fuel may interact with the sealant layer 106 which may comprise unvulcanized or partially vulcanized natural rubber (NR). Other materials that may be used for the sealant layer 106, as described above, may include but are not limited to polyisoprene (IR), styrene butadiene (SBR) or blends of SBR with NR or IR.

In this exemplary embodiment, the sealant layer 106 includes a first portion 106A which has expanded into the cavity 210A formed by the projectile 206. The sealant layer 106 is selected from materials that are tacky in nature and which may have autoadhesion characteristics. Such materials may also swell around openings formed by projectiles that penetrate the materials. In other cases, it is believed that swelling of the sealant layer could occur due to a reaction between the sealant and a hydrocarbon liquids or any other type of liquid which may be stored in the self-sealing volume.

The sealant materials are generally themselves hydrocarbon elastomers such as unvulcanized or partially vulcanized, and/or fully vulcanized natural rubber (NR). Other materials that may be used for the sealant layer 106, as described above, may include but are not limited to polyisoprene (IR), styrene butadiene (SBR) or blends of SBR with NR or IR. Generally the materials selected will serve to swell into a cavity as large as that made by common projectiles 206, such as a 50 caliber or 20 mm projectile, and smaller. The projectile 206 may comprise in-tact bullets, missiles, grenades, etc., and/or fragments thereof, and/or fragments from vehicle accidents/collisions.

This first portion 106A of the sealant layer 106 prevents the fluid 204 from escaping or leaking through the wall system 200 of the cavity 210A. Swelling of the sealant layer 106 initiates from the fuel side and proceeds in an outward direction. Fiber from the fabric layers 104A, 104B may also expand and fill the cavity 210 and may provide an additional, yet moderate level of sealing of the liquid 204 compared to the sealant layer 106. Meanwhile, the two elastomeric material layers 102C and 102D remain broken by the projectile 206.

As understood by one of ordinary skill in the art, various different sealing modalities may occur with the wall system 200. Because of strength, cut resistance and elongation of wall materials, the wall system 200 may stretch (bow) inward by a significant amount before the projectile 206 penetrates into the volume containing the fluid 204. When the wall system 200 recovers to essentially a flat surface, distances between materials forming the wall system 200 may shorten, and the stretched fibers and elastomeric molecular strands within the wall system 200 may provide a puckering kind of seal around the cavity/wound/opening. This seal may include the sealant layer 106 which may facilitate autoadhesion.

FIG. 2F is a cross-sectional view of the wall system 200 of FIG. 2E in which, in some instances, it is possible the fluid 204 may react with the sealant layer 106 causing the sealant layer 106 to further expand and to close the volume containing the fluid 204. In other instances or in addition to such a reaction between the fluid 204 and sealant layer 106, the sealant layer 106 as well as others may be stretched from the projectile 206 and this sealant layer 106 may provide a puckering kind of seal around the cavity/wound/opening due to inelastic expansion. Layer 106 is usually a hydrocarbon elastomer such as unvulcanized or partially vulcanized, and/or fully vulcanized natural rubber (NR). Other materials that may be used for the sealant layer 106, as described above, may include but are not limited to polyisoprene (IR), styrene butadiene (SBR) or blends of SBR with NR or IR.

In this exemplary embodiment, the first portion 106B has further expanded into the cavity 210B that was created by the projectile 206 when it passed through the wall system 200. As noted previously, the first portion 106B that has expanded into the cavity 210B because of its reaction with the fluid 204, which may comprise a hydrocarbon fuel, may prevent the fluid 204 from leaking through the cavity 210B formed by the projectile 206.

Referring now to FIG. 3A, this figure is a diagram illustrating fibers 105 receiving a polyurethane coating 301A. The coating 301A on the fibers 105 used to form a fiber layer 104C1 of FIGS. 1-2 may comprise solvated aliphatic polyurethane that is applied during the fiber or fabric manufacturing process. As understood by one of ordinary skill in the art, aliphatic is a general class of polyurethanes (excluding aromatic), which typically is easier to solvate than aromatic polyurethanes. Other materials in addition to polyurethanes can be used, such as a resorcinol formaldehyde latex (RFL) and an isocyanate.

FIG. 3B is a diagram illustrating a fabric comprising fibers 105 receiving a polyurethane coating 301B. The coating 301B on the fibers 105 used to form fabric layer 104C of FIGS. 1-2 may comprise solvated aliphatic polyurethane that is applied during the fiber or fabric manufacturing process. FIG. 3B further illustrates a nozzle 305 that may be used to apply the coating 301B of polyurethane to the fibers 105 of the fabric layer 104C2. Other ways or methods for applying the coating 301 may be used other than those illustrated in FIGS. 3A-3B, such as by applying the solvated polyurethane to the fabric layer 104C2 with a roller applicator or in a dip.

Figure 4A:
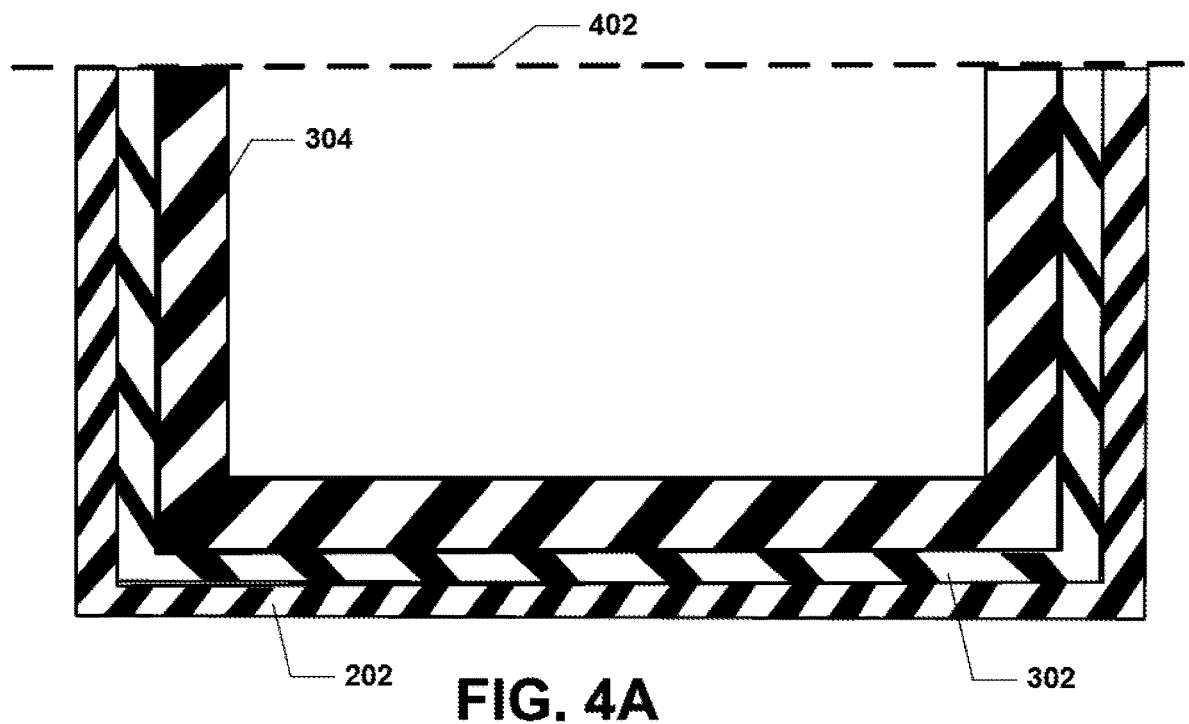
FIG. 4A is a cross-sectional view of a preform, a release layer, and a liner.

FIG. 4A is a cross-sectional view of one-half of a gas-impermeable, hollow preform or gas permeable solid preform 304, an elastomeric mold release layer 302, and a liner 202. The half-structure is noted by dashed line 402. As noted previously, the liner 202 layer may comprise any elastomeric material that will have a greater resistance to hydrocarbon fuel 204 than a polyurethane elastomer. Exemplary materials include, but are not limited to, nylon, polyurethane, nitrile rubber, polysulfide, polyurea, polyvinylalchohol (PVA), Hydrogenated Nitrile Butadiene Rubber (HNBR), Epichlorohydrin rubber (ECO), and/or polyvinylidene fluoride.

The preform 304 may comprise a molded or shaped object that has the general shape and dimensions representing the inside volume of a fuel tank. The preform 304 is gas-permeable or gas impermeable and it may comprise a solid hard material, in that the preform preferably may support the weight of the wall portion 100 illustrated in FIG. 1 during manufacturing. Suitable materials for the preform 304 may include, but are not limited to, plaster, polyurethane, polyurea, polyester or polystyrene foams. The preform 304 may be formed to have a shape suitable for a mold or it may be cut and sculpted to a desired shape. According to some exemplary embodiments, the preform 304 may comprise a gas-permeable solid structure such as illustrated in FIG. 7A (described below) or the preform 304 may comprise a gas-impermeable hollow structure such as illustrated in FIG. 7B (described below). The inventive system 200 and method 500 may also employ foam board preforms 304 as understood by one of ordinary skill in the art as an alternative to the preform material 304A, 304B used for the gas-permeable structures of FIG. 7A.

In the exemplary embodiment illustrated in FIG. 4A, the cross-sectional shape of the gas-permeable, hollow preform 304 may comprise a rectangular shape or a more complex shape. As noted above, other cross-sectional shapes are possible and are within the scope of the disclosure described herein. Other cross-sectional shapes include, but are not limited to, oval, cylindrical, triangular, hexagonal (See FIGS. 7A-7B), octagonal, and other like shapes or more complex convex and/or concave shapes that may be conducive for use as fuel tanks on military crafts and/or other vehicles, such as, but not limited to, police cars, race cards, armored vehicles, etc.

Positioned between the liner 202 and the preform 304 is an elastomeric mold release layer 302. The elastomeric mold release layer 302 may have at least two purposes. First, it may serve as an elastomeric bag that will allow gaseous pressurization from inside the preform 304. The gaseous pressure serves to expand the elastomeric mold release layer 302 and subsequently push the uncured wall 100 structure against the surfaces of mold 400A and 400B. In most cases, it is important that the elastomeric mold release layer 302 be leak tight during pressurization. Second, the elastomeric mold release layer 302 may serve as a mold release between the preform 304 and the liner 202. The elastomeric mold release layer 302 may comprise any conventional mold release material. Suitable mold release materials include, but are not limited to, silicone, elastomeric silicone, polyvinyl alcohol (PVA), polyolefin, or oil or grease mold release agents.

One of ordinary skill in the art will appreciate that the thicknesses illustrated in the cross-sectional view of FIG. 4A may have been exaggerated for viewing purposes. The thicknesses of the liner 202, the elastomeric mold release layer 302, and the preform 304 may be varied without departing from the scope of the disclosure described herein. According to one exemplary embodiment, the liner layer 202 may have a thickness of approximately 0.25 to approximately 1.0 mm, while the elastomeric mold release layer 302 may have a thickness of approximately 2.0 to approximately 3.0 mm, and the preform 304 may have a thickness of approximately 25.4 to approximately 100.0 mm. The preform 304 may be a monolithic solid structure, a hollow structure, or a layered structure, for example.

Figure 4B:
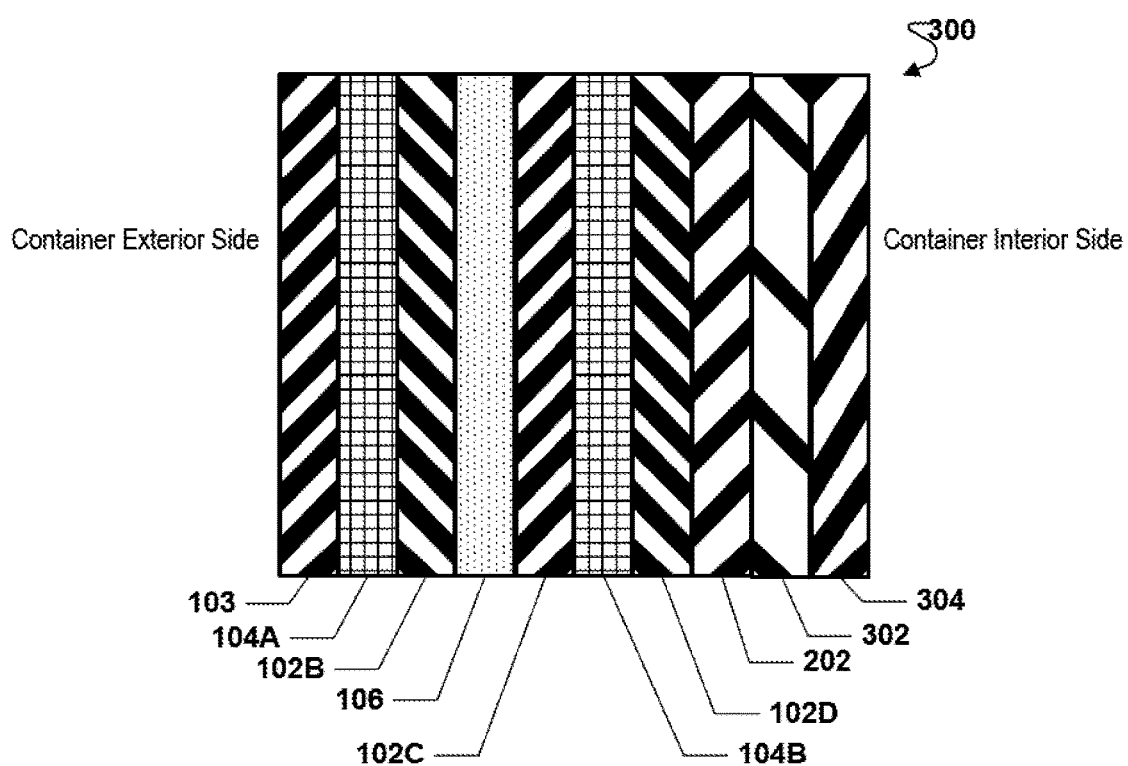
FIG. 4B is a cross-sectional view of an intermediate product that comprises the wall layers of FIG. 1 in addition to the preform, the release layer, and liner of FIG. 4A.

FIG. 4B is a cross-sectional view of an intermediate product 300 that comprises the wall portion 100 of FIG. 1 in addition to the preform 304, the release layer 302, and liner 202 as illustrated in FIG. 4A. The intermediate product 300 is characterized as such ("intermediate") because the preform 304 and elastomeric mold release layer 302 are not utilized in the end product for containing a fluid 204, such as a fuel. The illustration of the intermediate product 300 of FIG. 4A is helpful in understanding how a completed fuel tank or final product forming the wall system 200 as illustrated in FIGS. 2 and 4E-4E is manufactured.

Figure 4C:
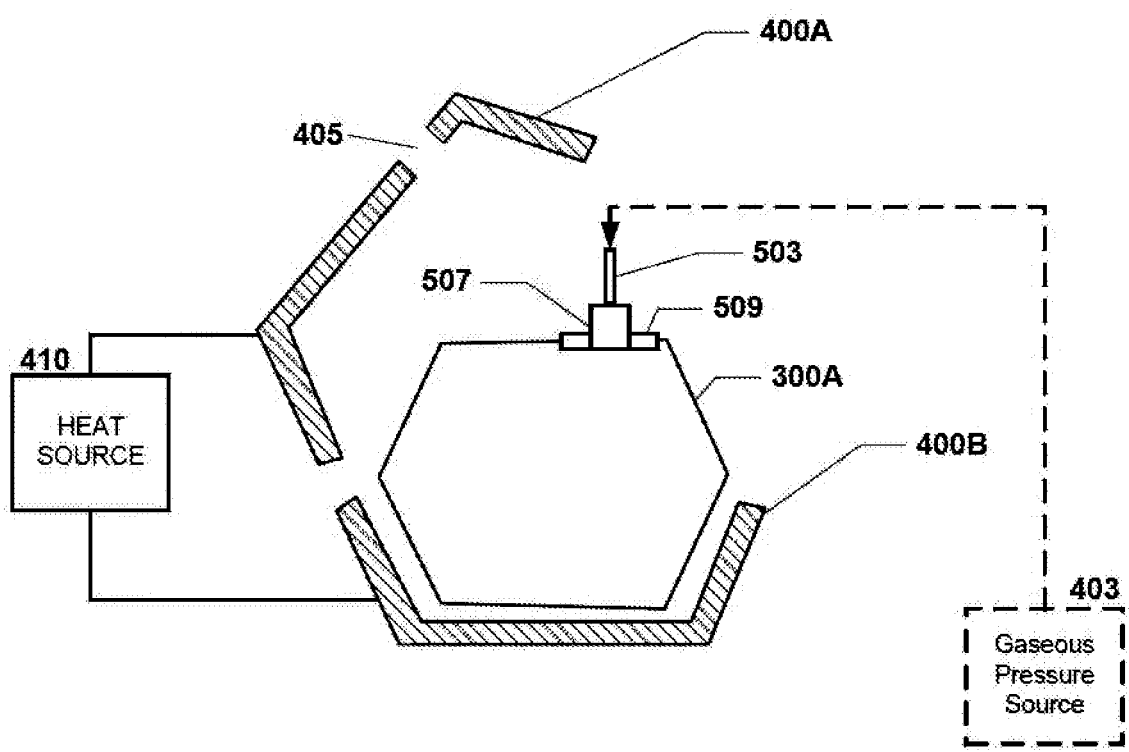
FIG. 4C is a diagram illustrating how the intermediate product of FIG. 4B is positioned within a mold according to one exemplary embodiment.

FIG. 4C is a diagram illustrating how the intermediate product 300A of FIG. 4B (which comprises the preform 304 and the elastomeric mold release layer 302 but no liquid 204) is positioned within a mold 400 and coupled to a gaseous pressure source 403 according to one exemplary embodiment. According to this exemplary embodiment, the intermediate product 300A has a hexagonal shape compared to the rectangular cross-sectional shape illustrated in FIG. 4B.

In the exemplary embodiment illustrated in FIG. 4C, the mold 400 may comprise two halves 400A, 400B which are joined together. The two halves 400A, 400 may be coupled together by any type of mechanical fastener, such as, but not limited to a hinge. Other types of molds 400, such as a two piece compression mold 400, as well as other molding techniques may be employed such as compression molding. The actual number of mold sections can be more than two and is dictated by each individual volume geometry requirement. The mold section design also aids in the removal of the final product once the curing is complete. The mold 400 controls the dimension of the final product, which is the wall system/self-sealable volume 200 as illustrated in FIG. 1A.

Exemplary dimensions for the mold include, but are not limited to, about 499.00 mm by about 555.00 mm by about 96.50 mm (or about 19.65 inches by about 21.85 inches by about 3.80 inches). It is noted that the 19.65 inches measurement corresponds to the 19.79 inches measurement for the self-sealing volume listed in Table 1 described below. It is further noted that the preform 304 does not control the final dimensions of the wall system/self-sealable volume 200.

TABLE 1

Exemplary self-sealing volume dimensions vs. conventional manufacturing methods

| | Conventional Bladder | | | | Exemplary Bladder | | | |
|---|---|---|---|---|---|---|---|---|
| Measurement | Date Measured | Bladder SN | Measurement 1 Width 2" from end | Measurement 2 Width 5" from end | Date Measured | Bladder SN | Measurement 1 Width 2" from end | Measurement 2 Width 5" from end |
| 1 | Sep. 10, 2012 | Dec-54 | 17.59 | 17.48 | Sep. 19, 2012 | 398 | 19.76 | 19.78 |
| 2 | Sep. 10, 2012 | 12-75890 | 17.59 | 17.53 | Sep. 19, 2012 | 381 | 19.8 | 19.82 |
| 3 | Sep. 10, 2012 | 12-75862 | 17.57 | 17.6 | Sep. 19, 2012 | 382 | 19.8 | 19.81 |
| 4 | Sep. 10, 2012 | 12-75871 | 17.52 | 17.58 | Sep. 19, 2012 | 383 | 19.79 | 19.78 |
| 5 | Sep. 10, 2012 | 12-75894 | 17.58 | 17.5 | Sep. 19, 2012 | 379 | 19.77 | 19.79 |
| 6 | Sep. 10, 2012 | 12-75859 | 17.61 | 17.6 | Sep. 19, 2012 | 371 | 19.8 | 19.8 |
| 7 | Sep. 19, 2012 | 12-75848 | 17.67 | 17.54 | Sep. 19, 2012 | 400 | 19.78 | 19.79 |
| 8 | Sep. 19, 2012 | 12-75888 | 17.65 | 17.38 | Sep. 19, 2012 | 396 | 19.78 | 19.75 |
| 9 | Sep. 19, 2012 | 12-75933 | 17.59 | 17.4 | Sep. 19, 2012 | 372 | 19.79 | 19.8 |
| 10 | Sep. 19, 2012 | 12-75892 | 17.57 | 17.41 | Sep. 19, 2012 | 390 | 19.8 | 19.81 |
| 11 | Sep. 19, 2012 | 12-75885 | 17.58 | 17.6 | Sep. 19, 2012 | 393 | 19.8 | 19.79 |
| 12 | Sep. 19, 2012 | 12-75899 | 17.62 | 17.49 | Sep. 19, 2012 | 380 | 19.78 | 19.8 |
| 13 | Sep. 20, 2012 | 12-75907 | 17.59 | 17.46 | Sep. 19, 2012 | 376 | 19.81 | 19.8 |
| 14 | Sep. 20, 2012 | 12-75942 | 17.7 | 17.5 | Sep. 19, 2012 | 375 | 19.8 | 19.79 |
| 15 | Sep. 20, 2012 | 12-75924 | 17.61 | 17.49 | Sep. 19, 2012 | 374 | 19.8 | 19.8 |
| 16 | Sep. 20, 2012 | 12-75873 | 17.67 | 17.61 | Sep. 19, 2012 | 377 | 19.81 | 19.8 |
| 17 | Sep. 20, 2012 | 12-75920 | 17.51 | 17.59 | | | | |
| 18 | Sep. 20, 2012 | 12-75884 | 17.45 | 17.39 | | | | |
| 19 | Sep. 20, 2012 | 12-75874 | 17.66 | 17.48 | | | | |
| 20 | Sep. 20, 2012 | 12-75910 | 17.55 | 17.37 | | | | |
| 21 | Sep. 20, 2012 | 12-75788 | 17.66 | 17.39 | | | | |
| 22 | Sep. 20, 2012 | 12-75895 | 17.68 | 17.35 | | | | |
| Average | | | 17.6 | 17.49 | | | 19.79 | 19.79 |
| Std Dev | | | 0.061 | 0.086 | | | 0.014 | 0.016 |
| % CV | | | 0.35% | 0.49% | | | 0.07% | 0.08% |

After curing of the intermediate product 300A within the mold 400 and later removal of the preform 304 and elastomeric mold release layer 302, the cured structure forms the final wall system 200 of a self-sealing volume as illustrated in FIG. 4E and FIG. 2. The mold 400 may comprise a heat source 410 for generating heat to apply to the intermediate product 300A contained within the mold 400. A heat source 410 may comprise any type of heat appropriate for molding or curing elastomeric structures as understood by one of ordinary skill in the art. Exemplary heat sources 410 include, but are not limited to, conventional ovens, like convection ovens, microwave ovens, attached electrical strip heaters, autoclaves or attached tubing containing heated oil.

The mold 400 may also comprise a gaseous pressure source 403, like a pump, for generating gaseous pressure to apply to the intermediate product 300A contained within the mold 400. Specifically, the gaseous pressure source 403 may be coupled to an inlet 503. The inlet 503 may be coupled to a metal fixture 507 that is contained within a nut ring 509. A nut ring 509 may comprise an access port for fuel filling, venting, and a fuel pump. Each nut ring 509 may be fitted with one metal fixture 507. As understood by one of ordinary skill in the art, each metal fixture 507 is only used during bladder construction: It is removed after manufacture and is not used to make connections in a vehicle. Multiple nut rings 509 may be used for redundancy and/or for different connections to the resultant self-sealing volume 100 which is designed to contain fuel.

Each self-sealing volume 100 may have one or more nut rings 509. Each nut ring 509 may be fitted with cords or fabric flanges that extend radially into the elastomeric composite 100 to provide secure attachment of the nut ring 509 to the self-sealing volume 100. A nut ring is described and illustrated in U.S. Pat. No. 3,704,190, the entire contents of which are hereby incorporated by reference. A nut ring may have a circular shape. However, it may have other shapes too, such as, but not limited to, oval, rectangular, rectangular with rounded edges, pentagonal, octagonal, etc.

A gaseous pressure source 403 may comprise any type of gaseous pressure appropriate for forming a shaped part of elastomeric structures as understood by one of ordinary skill in the art. Exemplary gaseous pressure sources 403 include, but are not limited to, compressed air from a compressed cylinder or from a conventional air compressor, or compressed nitrogen, argon, carbon dioxide or helium from a compressed cylinder.

As noted previously, the elastomeric mold release layer 302 forms a gas tight seal around the preform 304 when the elastomeric mold release layer 302 is inflated by the gaseous pressure source 403. The elastomeric mold release layer 302 will expand the elastomeric material layers 102 when the elastomeric mold release layer 302 is inflated with a gas from the gaseous pressure source 403. The amount of pressure provided by the gaseous pressure source 403 is generally between about 2.0 psi to about 80.0 psi, and preferably between about 10.0 psi to about 40.0 psi, and more preferably at about 20.0 psi. However, other pressures may be used as understood by one of ordinary skill in the art and are within the scope of this disclosure.

Figure 4D:
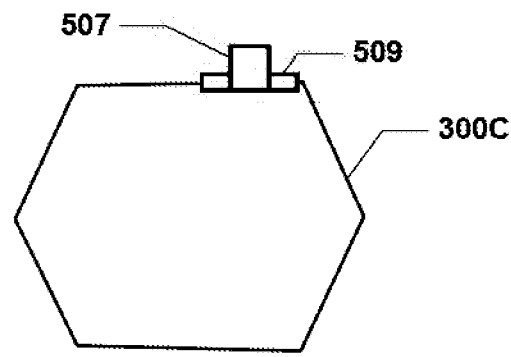
FIG. 4D is a diagram illustrating a cured intermediate product after the intermediate product is removed from the mold of FIG. 4C.
Figure 4E:
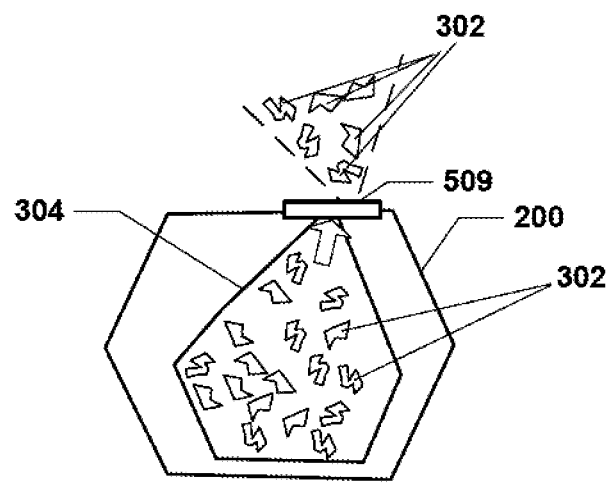
FIG. 4E is a diagram illustrating the formation of the completed product of FIGS. 2A-2F by removal of the preform and release layer.

FIG. 4D is a diagram illustrating a cured intermediate product 300C after the intermediate product 300C is removed from the mold 400 of FIG. 4C, disconnected from the inlet 503 and gas pressure source 403, and after the intermediate product 300C has been cured. The intermediate product 300C may have any three dimensional shape including regular cubic square or rectangular cross-sectional shape or an irregular cubic quadrilateral shape or a complex multisided three dimensional shape. In the exemplary embodiment illustrated in FIG. 4D, the intermediate product 300C has a hexagonal shape.

The intermediate product 300C is characterized as such ("intermediate") because it comprises the elastomeric mold release layer 302 and the preform 304 (internally), which are not illustrated in this figure but are illustrated in FIGS. 4A-4B. The view of FIG. 4D is an external one of the intermediate product 300C such that the internal layers, such as the elastomeric mold release layer 302 and preform 304, are not visible.

FIG. 4E is a diagram illustrating the formation of the completed product 200 of FIGS. 2A-2F by removing the preform 304 and the release layer 304. The preform 304 and release layer 302 may be removed from the intermediate product 300C, as disclosed below.

The preform 304 and elastomeric mold release layer 302 may be removed after the intermediate product 300C has been fully cured and cooled. These two structures 304, 302 may be removed by breaking them into small pieces or chunks, or a single extended piece, and removing them through nut ring 509. The preform 304 may be smaller relative to (have outer dimensions which are less than) the finished product 200 since the preform 304 is filled with a fluid, like air, such that the mold release layer 302 expands from the fluid. The fluid may include a gas that is used while the finished product 200 is curing. The preform 304 usually does not change in size/dimensions when the fluid is provided inside the preform 304 to inflate the mold release layer 302.

Usually, the elastomeric mold release layer 302 is removed with the preform 304 illustrated in FIG. 4E. Then, the preform 304 may be removed through the nut ring 509 of the finished product 200. The nut ring 509 usually has a round shape, but other shapes may be employed as understood by one of ordinary skill in the art. Once these structures 304, 302 are completely removed, the finished and completed product 200 is formed as illustrated in FIG. 1A.

FIG. 4F1 is a cross-sectional view of a self-sealing volume 200 in the form of a fuel tank illustrating the individual composite layers along with paths 411 of air escape according to one exemplary embodiment. FIG. 4F1 has a breather structure 409. The wall system/volume 200 comprises a wall 100 and a liner 202 which will be described in more detail below. The self-sealing wall system 200 may contain a fluid 204 (See FIG. 1A), such as, but not limited to, a hydrocarbon fuel.

Other layers of the wall system or volume 200 may include a release layer 302 (which is used during formation of the volume 200 but later discarded after formation of volume 200), an elastomeric material and fabric 407, and sealant layer 106. The sealant layer 106 usually covers the entire (100%) of the surface area for the volume 200. The sealant layer 106 is responsible for sealing any punctures in the volume 200 should a projectile strike and penetrate through the wall 100 of the volume 200. Further details of the elastomeric material and fabric 407 will be described below in connection with FIG. 4F2. Similar to the other exemplary embodiments of the volume 200, the volume 200 of FIG. 4F1 may include a nut ring 509 as described above.

In the exemplary embodiment illustrated in FIG. 4F1, the volume 200 comprises three elastomeric material and fabric layers 407A, 407B, 407C in each corner that forms the first breather structure 409A. Specifically, the first breather structure 409A comprises the following layers along the geometrical ray AB as follows (starting from point A extending towards point B of ray AB): the release layer 302 (which is discarded after formation of the preform and prior to filling the volume 200), the liner 202, the first elastomeric material and fabric 407A, a second elastomeric material and fabric 407B, a sealant layer 106, and a third elastomeric material and fabric 407C.

The first breather structure 409 of the exemplary embodiment illustrated in FIG. 4F1 is formed in such a way that a first gap 479A between points C and D located on respective different sealant layers 106 is formed and filled with the second elastomeric material and fabric 407B. A fluid for manufacturing the volume 200, such as air, may be allowed to escape the volume 200 by following fabric path 411 which exists within elastomeric material and fabric layers 407A, 407B, and 407C. A second gap 479B is formed similarly on the other side of the first breather structure by the second elastomeric material and fabric 407B.

An edge portion or overlap portion O of the sealant layer 106 (which lies on top of an elastomeric material and fabric 407) in each breather structure 409 may have a length of between about a 0.25 of an inch to about 2.00 inches. The sealant layer 106 may have a thickness of between about 0.02 of an inch to about 0.12 of an inch. The elastomeric material and fabric layers 407 may each have a thickness between about 0.005 of an inch to about 0.03 of an inch.

The overall length (L) of the volume 200 may comprise a magnitude of about 20.0 inches, while the overall height (H) of the volume 200 may comprise a magnitude of about 10.0 inches. The volume 200 may have width dimension (not visible) having a magnitude of about 22.0 inches. As noted previously, the shape of the volume 200 may be varied without departing from the scope of this disclosure. Therefore, other magnitudes for the length (L), width, and height (H) may be possible with different geometrical shapes for the volume 200.

Further, one of ordinary skill the art will recognize that the number and size of the layers may be varied without departing from the scope of the present disclosure. That is, fewer or a greater number of layers with different thicknesses may be used for a particular embodiment without departing from the scope of the technology described herein.

In each of the figures of this disclosure, the breather structure 409 may appear to have a thickness and size which are greater than a respective side of the volume 200. In other words, each breather structure 409 may appear to be "bulging" relative to the sides of the volume 200 which do not have a breather structure 409. However, the figures of this disclosure with respect to the breather structure 409 have been greatly exaggerated. In the actual final volume 200, each breather structure 409 and its relative thickness are usually very difficult to detect with the naked eye.

FIG. 4F2 is a side view of an elastomeric material and fabric 407 that is depicted in FIG. 4F1. The elastomeric material and fabric 407 may comprise three layers sandwiched together: a first elastomeric material matrix layer 102 (as described above in connection with FIGS. 1-3), a fabric or fiber layer 104, and a second elastomeric material matrix layer 102. The first and second elastomeric materials 102 envelope or sandwich the fabric layer 104 therebetween. The elastomeric materials 102 have been described in detail above. In many embodiments, the two elastomeric materials 102 are absorbed into the fabric or fiber layer 104 instead of encasing/circumscribing the fabric layer 104.

Each elastomeric material/matrix layer 102 may comprise at least one each of styrene butadiene rubber dispersions, nitrile butyl rubber dispersions, polychloroprene dispersions, polyurethane dispersions, polyurea dispersions, solvated polyureas, solvated polyurethanes, solvated nitrile butyl rubber, solvated polychloroprene, silicones, polysulfides, polyurethane ureas, epoxy, polyester, silicone. Each fabric layer 104 may comprise one or more layers of fabrics made from at least one of nylon, aramid, polyester polypropylene and polyethylene. Each fabric layer 104 may also comprise cords in which each cord has a diameter of between about 0.0624 of an inch to about 0.25 an inch. Each elastomeric material and fabric 407 may have a weight between about 2.0 oz/square yard to about 36.0 oz/square yard. The fabric types may include, but are not limited to, woven materials, non-woven materials, and knitted materials.

Figure 4I:
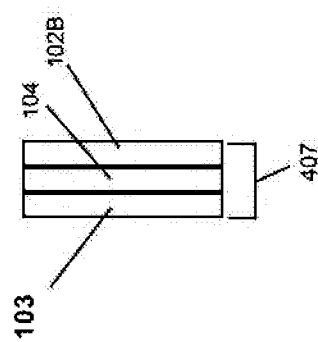
FIG. 4I is a side view of a corner of a self-sealing volume illustrating an alternative lay-up pattern where the sealant material has been perforated with holes. The sealant is subsequently covered with fabric and the holes are covered with sealant patches that are larger than the original holes. The holes can be any shape.
Figure 4I:
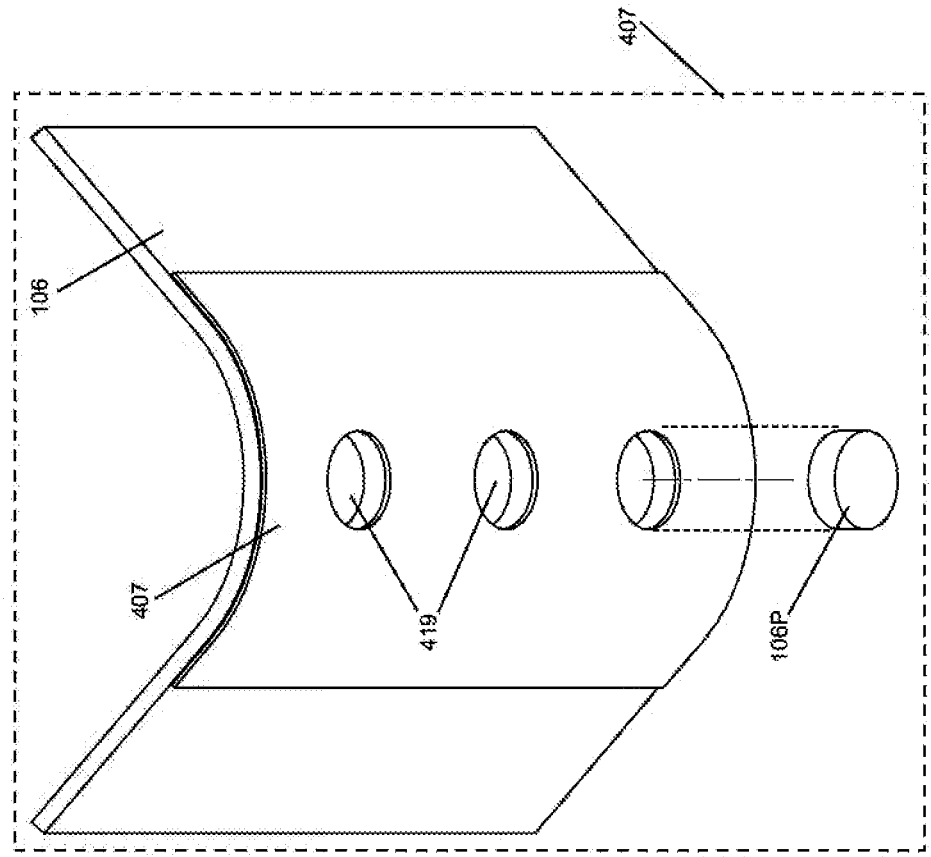
Figure 4G:
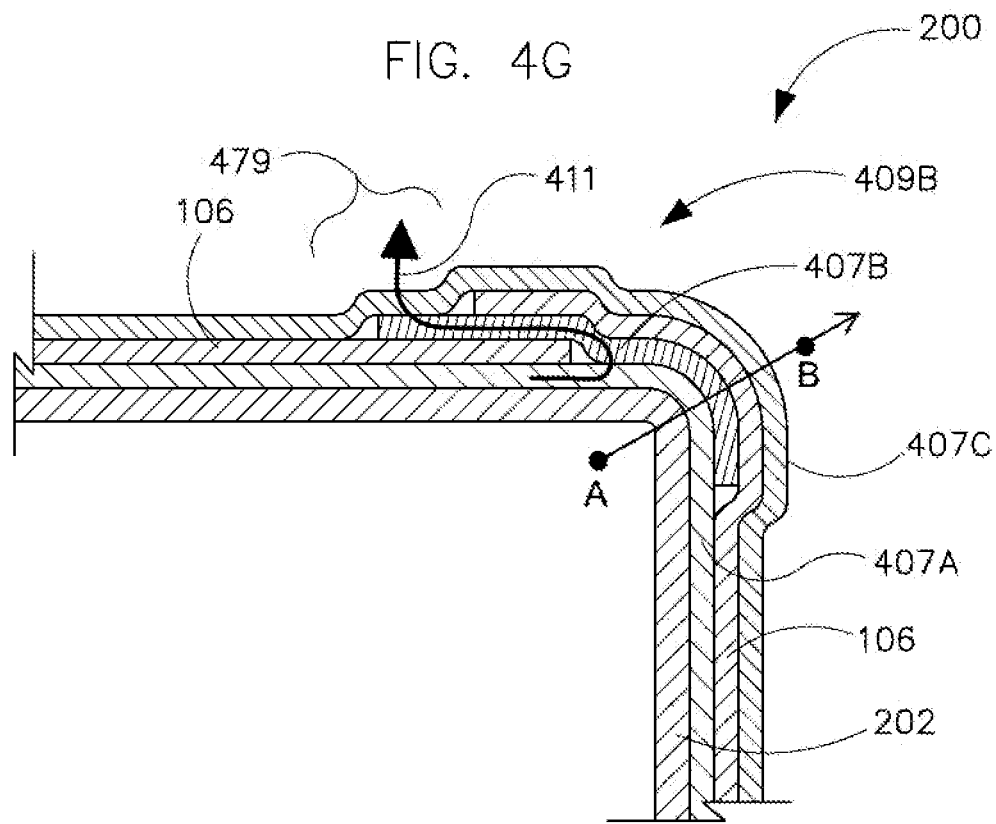
FIG. 4G is a cross-sectional view of a corner of a self-sealing volume illustrating an alternative layup pattern where one or more structural fabric plies are located on one side of the sealant layer.

FIG. 4G is a cross-sectional view of a corner of a self-sealing volume 200 illustrating an alternative layup pattern where one or more structural fabric plies are located on one side of the sealant layer 106. The mold release layer 302 is not present in this embodiment: it has been removed. The sequence of layers for the exemplary embodiment illustrated in FIG. 4G are as follows using geometrical ray AB as a reference for the sequence of materials that form the breather structure 409B of FIG. 4G: liner 202, a first elastomeric material and fabric 407A, a second elastomeric material and fabric 407B, sealant layer 106, and a third elastomeric material and fabric 407C.

Relative to the first breather structure 409A illustrated in FIG. 4F1, the second breather structure 409B illustrated in FIG. 4G has only a single gap 479 formed between the two sealant layers 106 by the second fabric 407B for a respective corner region of the volume 200. A fluid or gas, like water, solvent or air, may flow along fabric path 411. Meanwhile, the sealant layer 106 for the first breather structure 409A has two gaps and two fabric paths 411 per corner illustrated in FIG. 4F1.

Figure 4H:
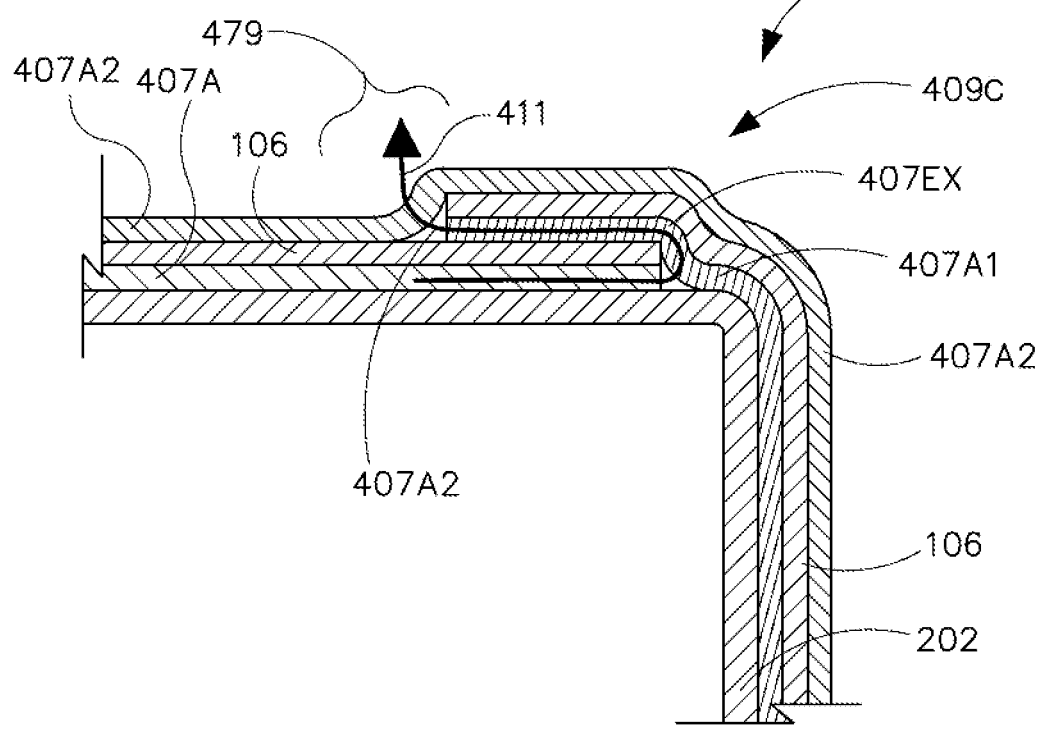
FIG. 4H is a cross-sectional view of a corner of a self-sealing volume illustrating an alternative layup pattern where three or more structural fabric plies are separated by the sealant layer.

FIG. 4H is a cross-sectional view of a corner of a self-sealing volume 200 illustrating an alternative layup pattern where one of the fabric layers 407A1 is extended in a continuous manner around the sealant layer 106 to meet the outer fabric layer 407A2. The mold release layer 302 is not present in this embodiment: it has been removed. Following the first fabric layer 407A1 along solvent, water or air escape path 411, the first fabric layer 407A1 has an extension region 407EX that continues towards the outer layer 407A2. With this configuration, another single gap 479, like the exemplary embodiment illustrated in FIG. 4G, is formed for this breather structure 409C.

FIG. 4I is a side view of a corner of a self-sealing volume 200 illustrating a view of outside layers down to the sealant layer 106 where layers inside sealant layer 106 are not shown and provide an alternative lay-up pattern where the sealant layer 106 has been perforated with apertures 419. The sealant layer 106 is subsequently covered with fabric elastomeric material and fabric layers 407A and the areas where apertures 419 are located are covered with sealant patches 106P that are larger than the original holes 419. A final elastomeric material and fabric 407A (not illustrated) covers sealant patches 106P and elastomeric material and fabric 407.

The apertures 419 can be any shape, such as, but not limited to, circular, elliptical, rectangular, square, slits and other similar geometric shapes. The size of the apertures 419, such as diameters for round apertures 419, may range between about 0.05 of an inch to about 1.0 inch. The sealant patches 106P and corresponding elastomeric material and fabric 407 covering the apertures 419 are covered with a final elastomeric material and fabric 407 as indicated with the dashed line 407 in this FIG. 1.

FIGS. 4J1-4J5 are side views of the formation of a self-sealing volume 200 using a straight wall lay-up technique in which the breather structure is located in a lateral side of the volume 200 instead of a corner of the volume 200. Any of the build configurations described in this disclosure may have breather structures located in sides of the volume 200, in corners of the volume 200, or in combinations thereof.

With a lay-up technique, the layers illustrated in each figure are applied in sequence. The elastomeric material layers 102 (part of elastomeric material and fabric 407) provide the necessary tack/adhesive to hold all structures together before curing. The layers in FIGS. 4J1-4J5 are applied by hand using tools such as a spatula or roller to smooth out and remove as much trapped air as possible.

Specifically, FIG. 4J1 is a side view of an intermediate self-sealing volume 200 illustrating an inner, first elastomeric material and fabric 407 applied over a liner layer 202 (not visible in this FIG. 4J1 but see FIG. 4F1). After the first elastomeric material and fabric 407 is applied over the liner 202, then in FIG. 4J2, a sealant layer 106 is applied.

Specifically, and referring to FIG. 4J2, a side view of an intermediate self-sealing volume 200 illustrates the sealant layer 106 applied with a gap 413 over the elastomeric material and fabric 407 of FIG. 4J1. Within this gap 413, the elastomeric material and fabric 407 is visible. The gap 413 may have a width dimension of between about 0.10 of an inch to about 3.00 inches. However, other widths are possible and are within the scope of this disclosure.

Referring now to FIG. 4J3, this figure is a side view of an intermediate self-sealing volume 200 illustrating a rectangular breather fabric 407R applied over the gap 413 (illustrated in FIG. 4J2). This rectangular breather fabric 407R may have a length dimension (L1) of between about 0.5 of an inch to about 4.00 inches that extends beyond gap 413 on either side of gap 413 (about 0.25 to about 1.00 inch on either side of sealant patch 106P) which usually is less than the overall length of the volume 200.

Next, FIG. 4J4 is a side view of an intermediate self-sealing volume 200 illustrating a sealant patch 106P applied over the gap 413 and rectangular breather fabric 407R of FIG. 4J3. The sealant patch 106P may have a length dimension (L2) of approximately between about 0.25 of an inch to about 1.00 inch that extends beyond gap 413 but less than fabric 407R on either side of fabric 407R (about 0.25 to about 1.00 inch less on either side of fabric 407R) which usually is less than the overall length of the volume 200] And FIG. 4J5 is a side view of an intermediate self-sealing volume 200 illustrating an outer, second elastomeric material and fabric 407 applied over the sealant patch 106P and sealant 106 of FIG. 4J4.

FIGS. 4K1-4K7 are views of the formation of a self-sealing volume 200 using a calendared sealant patch technique. Specifically, FIG. 4K1 is a side view of an intermediate self-sealing volume 200 illustrating an inner, first elastomeric material and fabric 407 positioned over a liner layer 202 (not visible in this FIG. 4K1 but see FIG. 4F1).

FIG. 4K2 is a side view of an intermediate self-sealing volume 200 illustrating the sealant layer 106A or a calendared sealant 106A applied with a gap 413 over the elastomeric material and fabric 407 of FIG. 4K1. For forming a calendared sealant 106A, the sealant 106 is previously laminated directly to a fabric 407 by passing the sealant 106 and fabric 407, stacked together, between solid metal rolls under pressure.

The gap 413 of FIG. 4K2 may have the same dimensions described above with respect to the exemplary embodiment illustrated in FIG. 4J. Similar to FIG. 4J2 described above, within this gap 413, the elastomeric material and fabric 407 is visible. Next, FIG. 4K3 is a side view of an intermediate self-sealing volume 200 illustrating a calendared sealant patch 106CP applied over the gap 413 and sealant 106A of FIG. 4K2. Usually, calendared sealant patch 106CP is applied so that fabric side is positioned on sealant layer 106A. The calendared sealant patch 106CP may have a length dimension (L3) of approximately between about 0.5 of an inch to about 4.00 inches that extends beyond gap 413 on either side of gap 413 (about 0.25 to about 1.00 inch on either side of gap 413)]. Next, FIG. 4K4 is a side view of an intermediate self-sealing volume 200 illustrating an outer, second elastomeric material and fabric 407 applied over the calendared sealant patch 106CP and sealant layers 106A of FIG. 4K3.

FIG. 4K5 is a cross-sectional, top view of the calendared sealant patch embodiment of FIG. 4K4. In this exemplary embodiment illustrated in FIG. 4K5, the gap or absence of material 413 between sealant layers 106A is more visible. The inner most elastomeric material and fabric 407A faces the inside of the volume 200 while the outermost elastomeric material and fabric 407B faces an outside or exterior of the volume 200. As noted previously, the gap 413 allows a manufacturing fluid, such as water, solvent or air, to permeate through the first elastomeric material and fabric 407A, through the gap 413 between the sealant layers 106 and through the calendared patch layer 106CP and outermost elastomeric material and fabric 407B corresponding to directional arrow A in this FIG. 4K5.

Figure 5A:
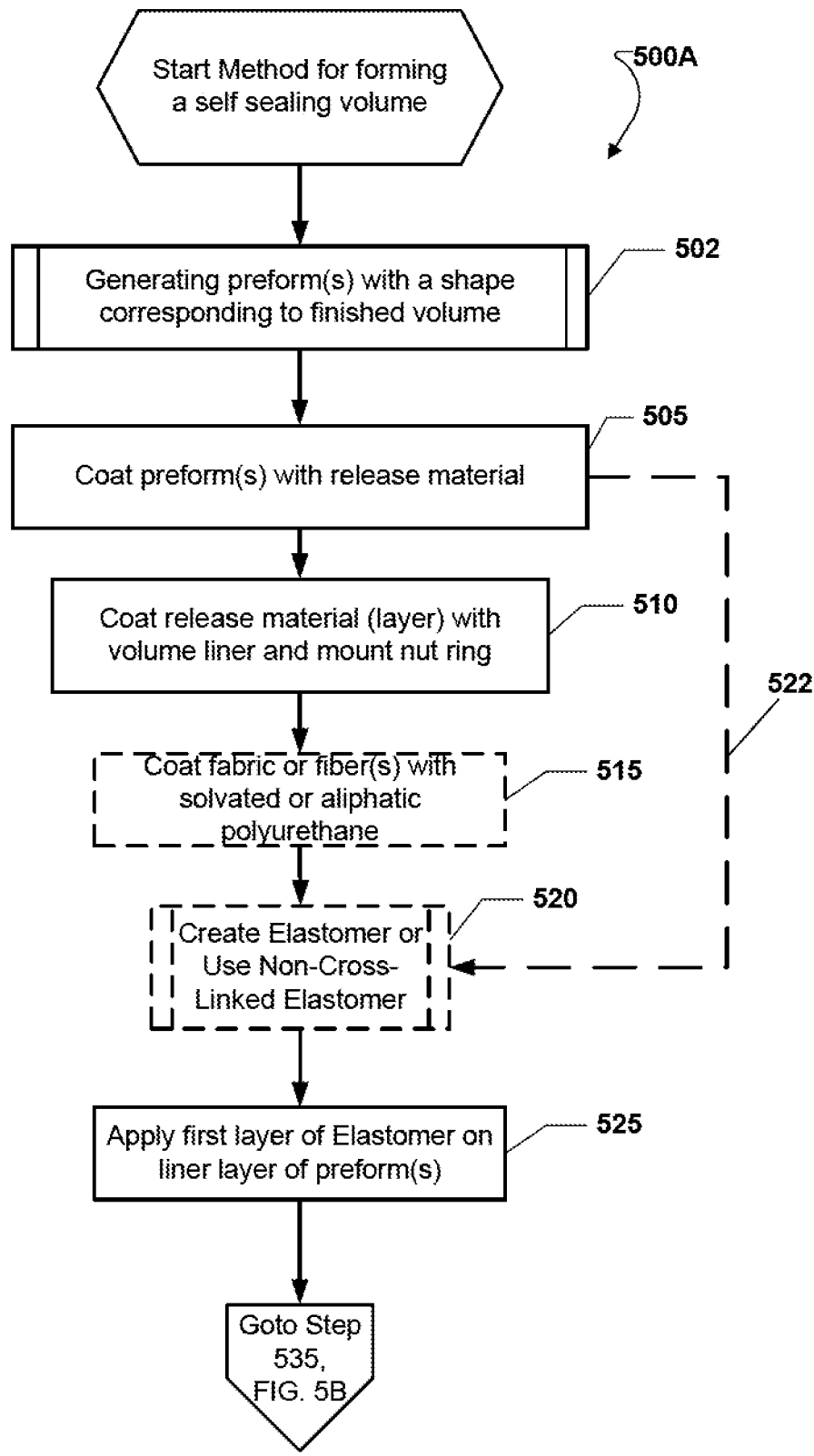
FIG. 5A is a flowchart illustrating a method for forming a self-sealing volume according to an exemplary embodiment.
Figure 5B:
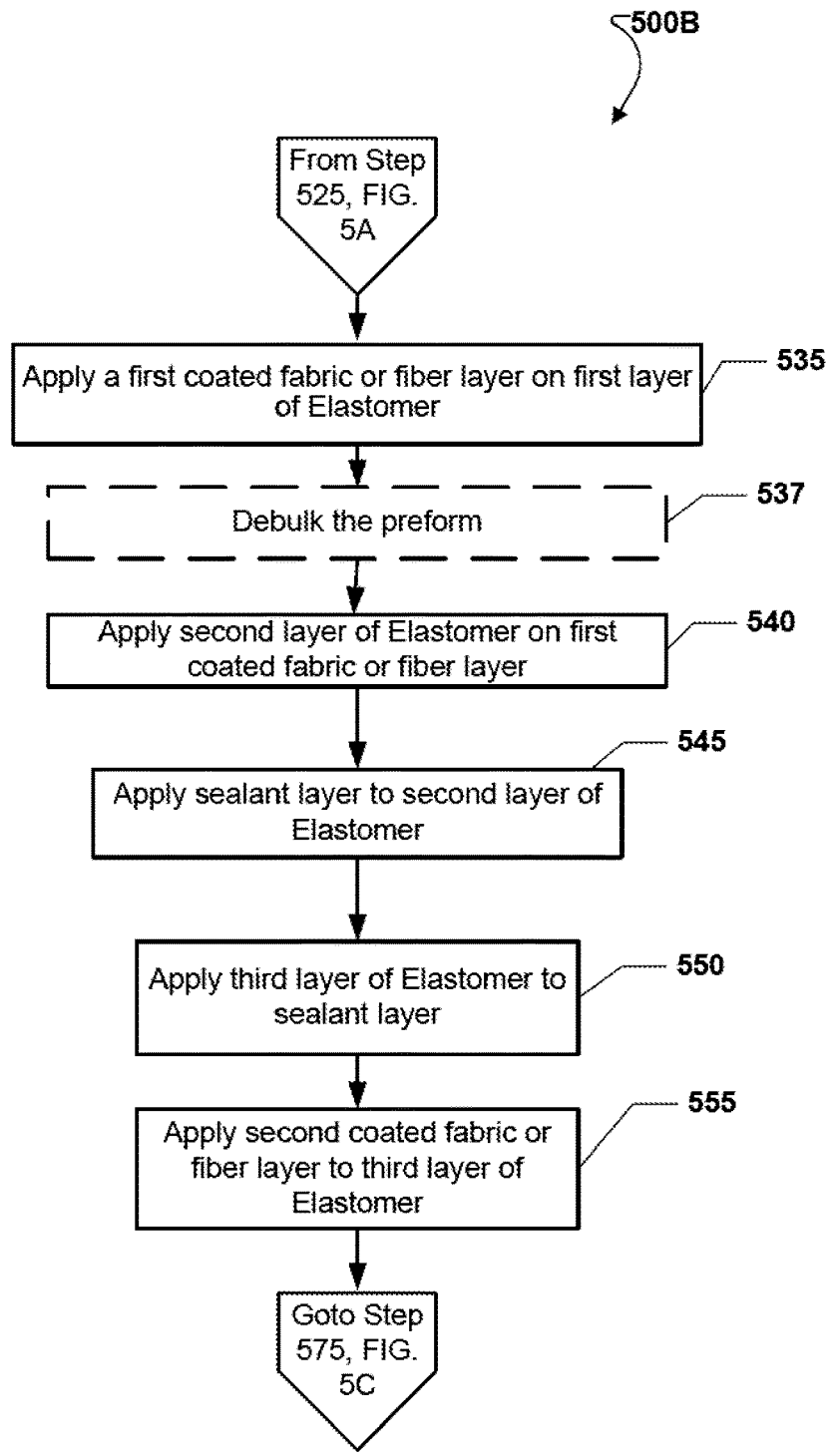
FIG. 5B is a continuation flowchart of FIG. 5A illustrating the method for forming a self-sealing volume according to an exemplary embodiment.
Figure 5C:
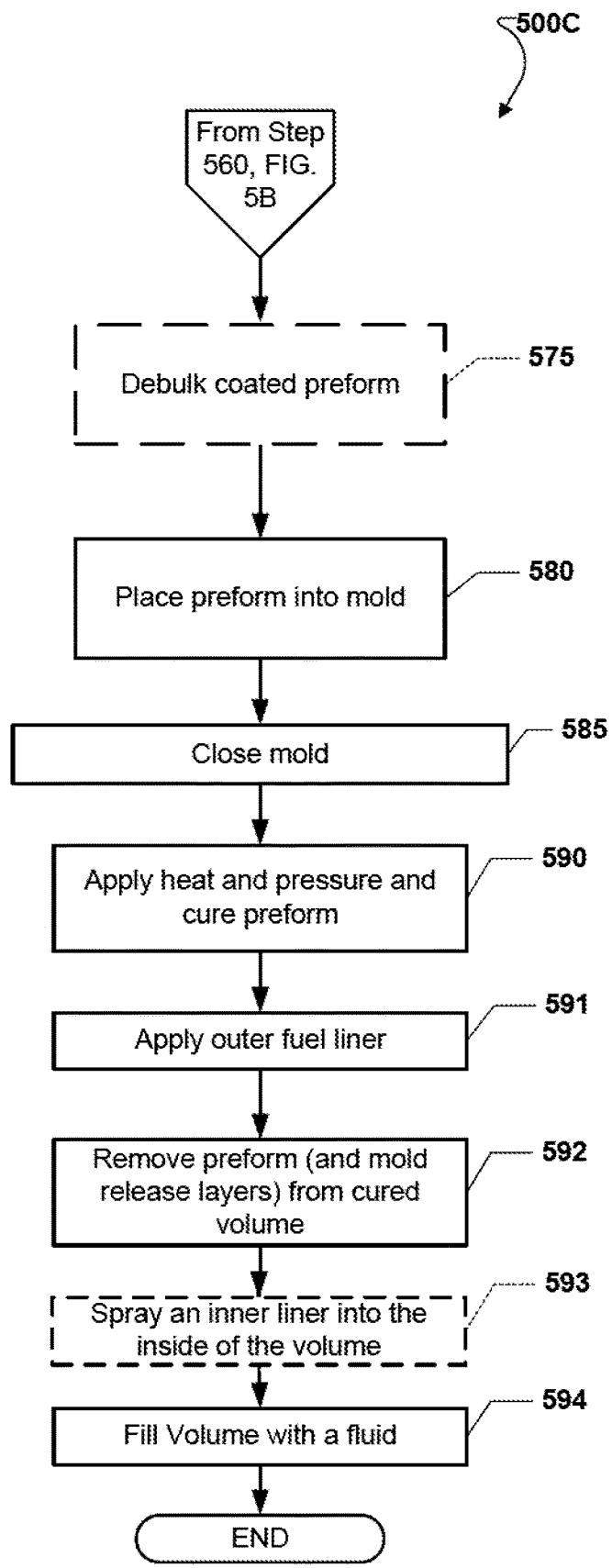
FIG. 5C is a continuation flowchart of FIG. 5B illustrating the method for forming a self-sealing volume according to an exemplary embodiment.
Figure 6:
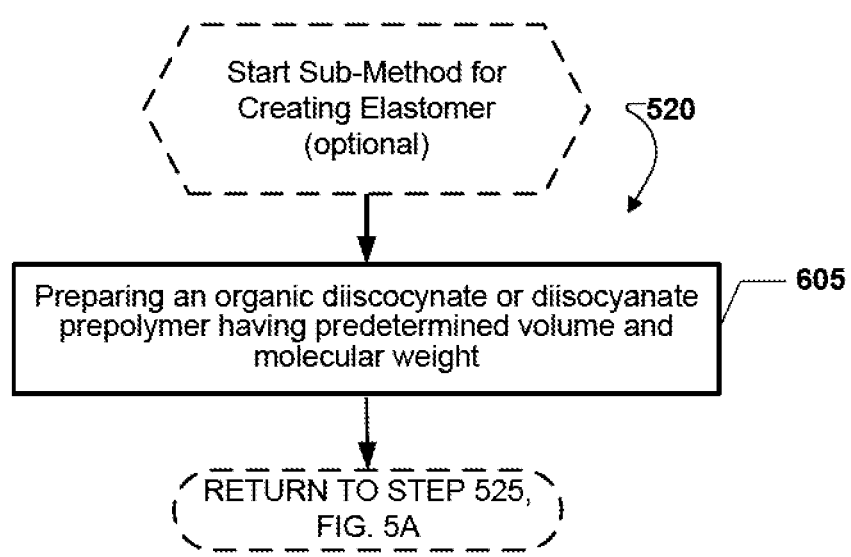

FIG. 4K6 is a side view of the calendared sealant patch 106CP of FIGS. 4K3 and 4K5 alone. FIG. 4K7 is a cross-sectional view of the calendared sealant patch 106CP illustrated in FIG. 4K6. Like the sealant layer 106 described above, the calendared sealant patch 106CP may have a thickness of between about 0.02 of an inch to about 0.3 of an inch. The calendared sealant patch 106CP may comprise a fabric 417 made of nylon, polyester, polypropylene, and an aramid having exemplary weights between about 1.0 ounces to about 32.0 ounces. The fabric can be woven, nonwoven, or knit. The sealant layer or side 106 is pressed on or calendared onto the fabric 107. Lower weight fabric may be employed such as nylon fabric having exemplary weights between about 1.0 ounce to about 12.0 ounces, and preferably, about 2.0 ounces.

FIGS. 4L1-4L5 are side views of the formation of a self-sealing volume 200 using a breather fabric strips or cords technique. FIG. 4L1 is a side view of an intermediate self-sealing volume 200 illustrating an inner, first elastomeric material and fabric 407 positioned over a liner layer 202 (not visible in this FIG. 4J1 but see FIG. 4F1). Next, FIG. 4L2 is a side view of an intermediate self-sealing volume 200 illustrating the sealant applied with a gap 413 over the elastomeric material and fabric 407 of FIG. 4L1. This gap 413 of FIG. 4L2 may have the same dimensions described above with respect to the exemplary embodiment illustrated in FIG. 4J. Similar to FIG. 4J2 described above, within this gap 413, the elastomeric material and fabric 407 is visible.

FIG. 4L3 is a side view of an intermediate self-sealing volume 200 illustrating breather fabric strips 407S applied over the gap 413 illustrated in FIG. 4L2. These strips 407S may have a length dimension of approximately between about 0.25 of an inch to about 4.00 inches and a width dimension of approximately between about 0.25 of an inch to about −2.0 inches. The number of strips 407S is usually between about 4 and about 20, depending upon size.

FIG. 4L4 is a side view of an intermediate self-sealing volume 200 illustrating a sealant patch 106P applied over the gap 413 and breather fabric strips 407S, as well as portions of the sealant layer 106A of FIG. 4L3. Similar to FIG. 4J4, the sealant patch 106P may have dimensions similar to the sealant patch 106P described above in connection with FIG. 4J4. FIG. 4L5 is a side view of an intermediate self-sealing volume 200 illustrating an outer layer of the elastomeric material and fabric 407 applied over the sealant patch 106P and sealant 106A of FIG. 4J4.

These FIGS. 4J, 4K, and 4L illustrate exemplary sequences of steps that may be taken in order to produce the breather structures 409 as illustrated in FIGS. 4F1, 4G, and 4I. However, one of ordinary skill the art will appreciate that other steps may be taken and other sequences of steps may be made while still creating the breather structures 409 as illustrated in FIGS. 4F1, 4G, and 4I.

Referring now to FIG. 5A, this figure is a flowchart illustrating a method 500 for forming a self-sealing volume 200 according to an exemplary embodiment. Routine block 502 is the first block of method 500. In routine or sub-method block 502, a preform 304 as illustrated in FIG. 4A and further illustrated in FIGS. 7A-7B may be generated. A preform 304 typically has a three dimensional shape as illustrated in FIGS. 4C, and 7A-7B. Further details of routine block 502 will be described below in connection with FIGS. 7A-7B, and FIGS. 8-9. The preform 304 may or may not have a symmetrical shape. At the end of block 502, a metal fixture 507 is mounted within the opening 405 of the preform mold.

Next, in block 505, the preform 304 may be coated with an elastomeric mold release material 302 as illustrated in FIG. 4A. As noted previously, this elastomeric mold release material may comprise silicone, elastomeric silicone, polyvinyl alcohol (PVA) or polyolefin mold release agents. Specifically, an elastomeric release material 302, such as SMOOTH-ON-EZ-SPRAY™ SILICONE® 20 silicone (which is a 20 Shore A silicone elastomer) may be sprayed or otherwise coated over the surface of the preform 304.

In block 510, the elastomeric mold release material 302 may be coated with a volume liner 202. Liner 202 may comprise any elastomeric material that will have a greater resistance to hydrocarbon fuel 204 than a polyurethane elastomer. Exemplary materials for the liner material 202 include, but are not limited to, polyurethane, polyurea, nitrile rubber, polysulfide, polyvinylalchohol (PVA), hydrogenated nitrile butadiene rubber (HNBR), epichlorohydrin rubber (ECO), and polyvinylidene fluoride. The inner liner 202 may comprise a polysulfide, such as PRC RAPID SEAL 655™ aliphatic polysulfide sold by PRC-DeSoto International, Inc. Or the liner 202 may comprise another fuel resistant elastomeric material. It can be sprayed in or on, coated or laid in as a sheet.

In block 510, a nut ring 509 may be mounted into the opening 405 of the preform mold containing the metal fixture 507 as understood by one of ordinary skill in the art. Each nut ring 509 is fitted with cords or fabric flanges that extend radially into the elastomeric composite 100 to provide secure attachment of the metal nut ring 509 to the self-sealing volume 100. These cords or fabric flanges are typically fitted on each nut ring 509 prior to starting method 500.

Alternatively, the volume 300A can be fabricated without the volume liner 202 which can be added in a subsequent step after the volume 300A is cured and the preform 304 and the elastomeric mold release layer 302 have been removed.

In an alternate exemplary embodiment, a path 522 is illustrated with a dashed line to convey that it's optional. It may be followed if the inner liner layer 202 is applied by spraying. Next, in optional block 515 (illustrated with dashed lines), the fabric or fiber layer 104 may be formed by coating the layer 104 with a solvated polyurethane. Alternatively, fabric or fiber layer 104 may be coated with a resorcinol formaldehyde resin or a solvated isocyanate.

Usually, this coating of the fiber layer 104 is completed as a separate step during manufacture of the fabric and it may not be part of the construction of the self-sealing container. Subsequently, in optional routine or submethod 520 (illustrated with dashed lines), the elastomeric material layer 102 may be created. Routine 520 has been highlighted with dashed lines to denote it is optional and would not be used if a non-cross-linked version of the polyurethane dispersion (See Example 2 described below) in the three examples noted below is selected for the elastomeric material layer 102. Further details of optional routine or submethod 520 are described below in connection with FIG. 6.

Next, in block 525, a first layer of the elastomeric material 102D as illustrated in FIG. 4B of the intermediate product 300 is applied to the liner 202. The elastomeric material 102D is also applied to fabric layer 104B. The method 500A then continues to block 535 of FIG. 5B.

FIG. 5B is a continuation flowchart of FIG. 5A illustrating the method 500B for forming a self-sealing volume 200 according to an exemplary embodiment. In block 535, a first coated fabric or fiber layer 104B is applied to the first layer 102D of the elastomeric material 102D as illustrated in FIG. 4B. In an alternative exemplary embodiment, the elastomeric material 102D may be applied to the coated fabric 104B and then these two layers 102D, 104B may be applied to the liner layer 202 in which the elastomeric material 102D is sandwiched between the fabric layer 104B and the liner layer 202.

Next, in optional block 537, (illustrated with dashed lines), the coated preform 304 having the wall structure illustrated in FIG. 4B is debulked so that the elastomeric material remains uniform throughout the fabric and excess water or solvent is removed. This may be accomplished by vacuum bagging and heating to the temperature at which evaporation of water will be facilitated, typically above about room temperature to about 120° C., and preferably below about 100° C. As it dries, the dispersion from layer 102 will coalesce in a time period of between about 60.0 minutes to about 360.0 minutes, and preferably in about 180.0 minutes.

In block 540, a second layer of the elastomeric material 102C is applied to the first coated fabric or fiber layer 104B of FIG. 4B. In block 545, sealant layer 106 may have a primer or adhesion activator coated on prior to application. Then, the sealant layer 106 is applied to the second layer of the elastomeric material 102C as illustrated in FIG. 4B. As noted previously, the sealant layer 106 may comprise natural rubber or partially vulcanized natural rubber (NR) (having less than about 1% sulfur). Other materials that may be used include polyisoprene (IR), styrene butadiene (SBR), blends of SBR with NR or IR, and low durometer polyurethanes (approximately Shore A less than 70). In block 550, a third layer of the elastomeric material 102B is applied to the sealant layer 106.

In block 555, a second coated fabric or fiber layer 104A is applied to the third layer of the elastomeric material 102B as illustrated in FIG. 4B. The method 500B then continues to block 575 of FIG. 5C.

FIG. 5C is a continuation flowchart of FIG. 5B illustrating the method 500C for forming a self-sealing volume according to an exemplary embodiment. Next, in optional block 575, (illustrated with dashed lines), the coated preform 304 having the wall structure illustrated in FIG. 4B may be debulked so that the elastomeric material remains uniform throughout the fabric and excess water or solvent is removed. This is accomplished by vacuum bagging and heating to the temperature at which evaporation of water will be facilitated, typically above about room temperature to about 120° C., and preferably below about 100° C. As it dries, the dispersion from layer 102 will usually coalesce in a time period of between about 60.0 minutes to about 360.0 minutes, and preferably in about 180.0 minutes. Next, in block 580, the coated preform 304 comprising the intermediate products 300A as illustrated in FIG. 4C is placed into a mold 400.

Subsequently, in block 585, the preform 304 forming the intermediate products 300A is closed within the mold 400 as illustrated in FIG. 4C. In block 590, heat and pressure may be applied to the mold 400 from heat source 410 and gas pressure source 403 in order to cure the preform 304 or intermediate product 300A to form the cured, single intermediate product 300C as illustrated in FIG. 4D. The gas pressure source 403 may fill the preform 304 while expanding the mold release layer 302 such that layer 302 pushes the composite wall structure/system 100 against the heated mold 400 during curing. This pressure can be between 5-100 psi, preferably between 10-40 psi, and preferably 20 psi. Specifically, the gas pressure source 403 may inflate the elastomeric mold release layer 302 that is on the outside of the gas-permeable preform 304 so that the wall structure 100 (FIG. 1B) is pressed against the heated mold 400. Temperatures for curing can be between 83° C. to about 177° C., but preferably 149° C. Once the structure 300A of FIG. 4C cures into structure 300C of FIG. 4D, the fixture 507 may be removed from the nut ring 509.

In block 591, an outer fuel liner 103 may be applied to the second coated fabric or fiber layer 104A as illustrated in FIG. 4B. The outer fuel liner 103 may comprise any elastomeric material that will have a greater resistance to hydrocarbon fuel 204 than a polyurethane elastomer. Exemplary materials for the outer fuel liner material 103 include, but are not limited to, polyurethane, polyurea, nitrile rubber, polysulfide, polyvinylalchohol (PVA), hydrogenated nitrile butadiene rubber (HNBR), epichlorohydrin rubber (ECO), and polyvinylidene fluoride. The outer liner 103 may comprise a cross-linked polyurethane as outlined in submethod 520 of FIG. 5A. Or the outer liner 103 may comprise another fuel resistant elastomeric material. It can be sprayed on, coated or laid in as a sheet. Final cure of the outer fuel liner 103 can take place by heat from a conventional oven, an autoclave, a microwave oven or from a press, or alternative ways as understood by one of ordinary skill in the art. Temperatures for curing can be between 52° C. to about 149° C., but preferably 83° C.

In block 592, the inlet 503, metal fixture 507, preform 304 and corresponding elastomeric mold release layer 302 attached thereto may then be removed from the resultant cured volume 300C as illustrated in FIG. 4E to form the completed wall system or self-sealing volume 200 as illustrated in FIG. 4E. Specifically, the preform 304 and corresponding elastomeric mold release layer 302 may be broken into small pieces relative to the entire cured volume or wall system 200 and removed through nut ring 509 that penetrates through the volume formed by the wall system 200 as illustrated in FIG. 4E.

Next in block 593, if a volume liner 202 was not added in block 510, a volume liner 202 can be sprayed into the completed volume 300C so that a liquid impermeable coating completely covers the inside of the volume 300C. Liner 202 may comprise any elastomeric material that will have a greater resistance to hydrocarbon fuel 204 than a polyurethane elastomer. Exemplary materials for the liner material 202 include, but are not limited to, polyurethane, nitrile rubber, polysulfide, polyurea, polyvinylalchohol (PVA), Hydrogenated nitrile butadiene rubber (HNBR), epichlorohydrin rubber (ECO) and polyvinylidene fluoride.

Next, in block 594, the volume formed by the wall system 200 may be filled with a fluid For example, the fluid may comprise a hydrocarbon fuel, such as gasoline or diesel. The method 500 then ends after block 594.

FIG. 6 is a flowchart illustrating optional routine or submethod 520 for creating an elastomeric material layer 102 according to an exemplary embodiment. Routine 520 of FIG. 5A has been highlighted with dashed lines to denote it is optional and would not be used if a non-cross-linked version of polyurethane of the three examples noted below (See Example 2 described below) is selected for the elastomeric material layer 102. However, if using a cross-linked polyurethane is desired, then this routine 520 may be followed. Block 605 is the first step of submethod or routine 520.

In block 605, a polyurethane dispersion having a predetermined molecular weight with a crosslinking agent is prepared. Normally, any of the well-known water dispersible polyurethanes useful for coating textiles may be utilized for the elastomeric material layer 102. Urethanes of toluene diisocyanate and methylene diphenyldiisocyanate are suitable exemplary materials as they are frequently used for coating textiles. The crosslinking agent can be any polydiisocyanate that is water dispersible. Water dispersible polydiisocyanates based on hexamethylene diisocyanate are suitable exemplary materials as they are frequently used as crosslinking agents for polyurethane dispersions. The amount of water dispersible polydiisocyanate used is about 2 to 5 weight percent based on the polyurethane dispersion. The submethod then returns to block 525 of FIG. 5A.

Referring now to FIG. 7A1, this figure illustrates a cross-sectional view of a device 400C, 400D for forming flexible molds 400E, 400F according to an exemplary embodiment. The device 400C, 400D may comprise two flexible molds shells that are used to create flexible molds 400E, 400F. In the exemplary embodiment illustrated in FIG. 7A1, the two mold shells have the cross-sectional shape of one half of geometric hexagon. As noted previously, inventive method and system are not limited to the shapes described or illustrated in this disclosure. Other shapes are possible as understood by one of ordinary skill in the art.

The two rigid mold shells 400C, 400D may comprise materials such as, but not limited to plaster, wood, molded plastic, clay, fiberglass composite, etc. One of the mold shells 400C, 400D may comprise an aperture or opening 405 such as mold shell 400D. This opening 405 will be used for a fixture 507 as will be described in further detail below.

As mentioned previously, FIGS. 7A and 7B illustrate one of several options for producing a preform. Other options/embodiments covered by this disclosure, but not illustrated, include three dimensional preform molds cut from a block of polyethylene, polystyrene foam or other similar material. In these other, alternative embodiments, the preform molds may be rigid (not flexible) as understood by one of ordinary skill in the art.

As illustrated in FIG. 7A1, the flexible molds 400E, 400F will generally have a shape that corresponds to the shape of the two rigid mold shells 400C, 400D. The flexible molds 400E, 400F previously made of a material such as, but not limited to, silicone, polyethylene, or polypropylene.

FIG. 7A2 is a cross-sectional view of the flexible molds 400E, 400F formed from the device 400C, 400D of FIG. 7A1 according to an exemplary embodiment. According to this exemplary embodiment, the two rigid mold shells 400C, 400D have been removed so that only the flexible molds 400E, 400F each having one half of a hexagonal cross-sectional shape remain. As noted previously, one of the flexible molds 400F has an opening 405.

FIG. 7A3 is a cross-sectional view of preform material 304A, 304B positioned within the flexible molds 400E, 400F of FIG. 7A2 according to an exemplary embodiment. According to this exemplary embodiment, the preform material 304A, 304B will form a gas-permeable, solid structure. The preform material 304A, 304B may be generated by mixing equal parts of a diisocyanate such as sold under the tradename SMARTFOAM A and a polyol such as SMARTFOAM B. These mixtures are poured into the fabricated two piece molds 400E, 400F that usually have inside dimensions which correspond to the required outside dimensions of the preform 304. Once the preform material 304B of the mold 400F cures slightly (or prior to pouring of the preform material 304B) the mold 400F may be fitted with a metal fixture 507.

The metal fixture 507 of FIG. 7A3 will provide ingress for air and will serve as a mounting for the preform 304 during layup. The location of the metal fixture 507 is selected to coincide with the location of a nut ring 509 in the finished self-sealing volume 100.

FIG. 7A4 is a cross-sectional view of the two halves of a gas-permeable, solid preform 304A, 304B generated from the flexible molds 400E, 400F of FIG. 7A3 according to an exemplary embodiment. In this exemplary embodiment, the flexible molds 400E, 400F have been removed such that the gas-permeable, solid preform halves 304A, 304B remain. The second half 304B has the metal fixture 507 as described above. These halves 304A, 304B may be rotated as indicated by the directional arrows until completely cured. Rotation may or may not be used. In other embodiments, the halves 304A, 304B are not rotated. The material described above for the preforms 304A, 304B generally cure at standard room temperature and pressure as understood by one of ordinary skill in the art.

FIG. 7A5 is a cross-sectional view of the two halves of the gas-permeable, solid preform 304A, 304B put/mated together according to an exemplary embodiment. The fully cured, two halves 304A, 304B are mated together by adhesives. Usually, adhesives that do not contain solvent or water may be employed. Such adhesives include, but are not limited to, epoxies or two part urethanes.

The resultant gas-permeable solid preform 304D may be characterized as a urethane preform 304D. This FIG. 7A5 also illustrates a coating 707 that may be applied to the preform surface to provide a smooth, rigid surface for build-up. Materials used for the coating 707 may include, but are not limited to, a rigid polyurethane such as FEATHERLITE® brand low-density urethane casting resin.

FIG. 7A6 is a cross-sectional view of the gas-permeable, solid preform 304D after apertures or holes 701 have been created within the preform 304D according to an exemplary embodiment. Any number of holes 701 may be created within the solid preform 304D. The holes 701 may be created with machines such as, but not limited to, drills or lasers. The holes 701 may be randomly positioned or positioned at evenly spaced intervals as understood by one of ordinary skill in the art. The holes 701 will help a fluid originating from the gaseous pressure source 403 to exit the preform 304D in order to properly inflate the release layer 302 as described above. Holes 701 are usually only needed if an impermeable skin (i.e. like FEATHERLITE® brand low-density urethane casting resin) is applied to the outside of the foam/solid preform 304D but can be used in any foam/solid preform 304D. Holes 701 are also usually needed in closed-cell foams forming the preform 304D which generally do not require the use of an outer shell (i.e like FEATHERLITE® brand low-density urethane casting resin). The depth of the holes 701 only need to penetrate the FEATHERLITE® brand low-density urethane casting resin, or close-cell foam skin but can penetrate further into the foam. The foam has pores which may connect to the holes 701. An open cell foam used for the solid preform 304D may not require any holes 701 in some instances.

The outer surface of the solid preform 304D may be sanded and finished to the desired internal dimension that may be used for the self-sealing volume 100 once formed, as understood by one of ordinary skill in the art. "Finished," as described herein, means to sand and smooth so as to remove cracks, seams and imperfections as understood by one of ordinary skill in the art.

Referring now to FIG. 7B1, this figure illustrates a cross-sectional view of a solid mold 400G, 400H for forming a gas-impermeable, hollow preform 304C according to an exemplary embodiment. This solid mold 400G, 400H is "solid" in the sense that its walls may comprise a solid material. However, the solid mold 400G, 400H may comprise a hollow interior 400Z so that a hollow type preform 304C (SEE FIG. 7B5) may be generated. The solid molds 400G and 400H are part of the submethod 502B described below in FIG. 9. Submethod 502B may comprise a form of roto casting (also known as rotacasting) as understood by one of ordinary skill in the art. Such rotacasting may use self-curing resins in unheated molds, and may share slow rotational speeds that are in common with rotational molding.

Similar to the exemplary embodiment illustrated in FIG. 7A, a portion, such as one half, of the solid mold 400G, 400H may comprise an opening 405 for receiving the fixture 507 (described above). The solid mold 400G, 400H may be made from materials such as metal, composites, etc. which can withstand curing temperatures for the hollow preform 304C (illustrated in FIGS. 7B5, 7B6).

FIG. 7B2 is a cross-sectional view of the solid mold 400G, 400H of B1 with a fixture 507 attached to a side 400G of the solid mold having an opening 405 according to an exemplary embodiment. The fixture 507 illustrated in FIG. 7B2 is similar to the one illustrated in FIG. 7A.

FIG. 7B3 is a cross-sectional view of the solid mold 400G, 400H in which a liquid state of preform material 304C is poured into the solid mold 400G, 400H via the fixture 507 according to an exemplary embodiment. The fixture 507 may receive a nozzle 503. The nozzle 503 may dispense the liquid state of the preform material 304C. The liquid state of the preform material 304C may comprise a material similar to the embodiment described in FIG. 7A. Specifically, the liquid state of the preform material 304C may comprise equal parts of a diisocyanate such as sold under the tradename FEATHERLITE Part A and a polyol such as FEATHERLITE Part B. The amount of diisocyante used generally comprises enough to coat the mold and provide a uniform preform thickness of between about 1.0 mm to about 10.0 mm.

FIG. 7B4 is a cross-sectional view of the solid mold 400G, 400H containing the preform liquid material 304C while the solid mold 400G, 400H is being rotated according to an exemplary embodiment. Specifically, after a requisite amount of liquid preform material 304C is deposited in the solid mold 400G, 400H, the fixture 505 is sealed and the solid mold 400G, 400H is rotated such that the preform material 304C cures in attaches to the inner volume of the solid mold 400G, 400H in order to generate a gas-impermeable, hollow type preform 304C. The material described above for the preform 304C generally cures at standard room temperature and pressure as understood by one of ordinary skill in the art.

FIG. 7B5 is a cross-sectional view of the solid mold 400G, 400H being opened after curing of the preform liquid material 304C into a gas-impermeable, hollow preform 304C according to an exemplary embodiment. The hollow preform 304C retains the fixture 507 after curing. The hollow preform 304C may have thickness which ranges between about 1.0 mm and about 10.0 mm.

FIG. 7B6 is a cross-sectional view of the gas-impermeable, hollow preform 304C after apertures or holes 701 have been created within the preform according to an exemplary embodiment. Any number of holes 701 may be created within the hollow preform 304C. The holes 701 may be created with machines such as, but not limited to, drills or lasers. The holes 701 may be randomly positioned or positioned at evenly spaced intervals as understood by one of ordinary skill in the art. The holes 701 will help a fluid originating from the gaseous pressure source 403 to exit the preform 304D in order to properly inflate the release layer 302 as described above.

The outer surface of the hollow preform 304C may be sanded and finished to the desired internal dimension that may be used for the self-sealing volume 100 once formed, as understood by one of ordinary skill in the art. "Finished," as described herein, means to sand and smooth so as to remove cracks, seams and imperfections as understood by one of ordinary skill in the art.

Figure 7C:
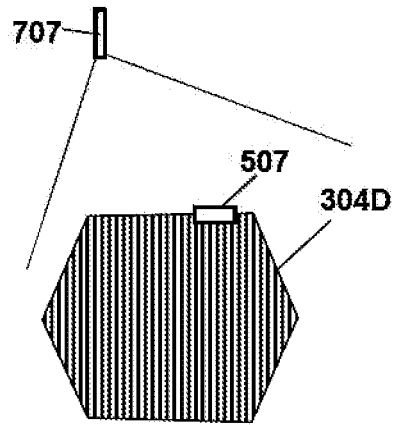
FIG. 7C illustrates a cross-sectional view of a device for forming flexible molds according to an exemplary embodiment.
Figure 7C:
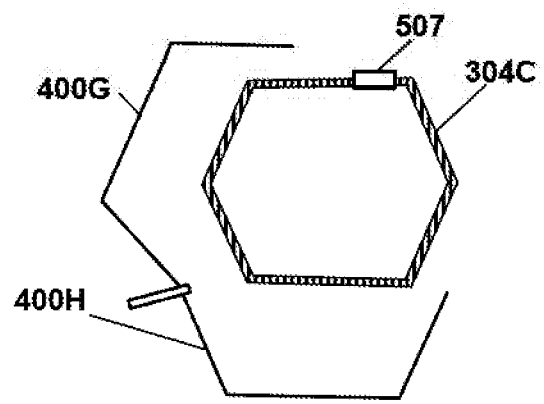
Figure 7C:
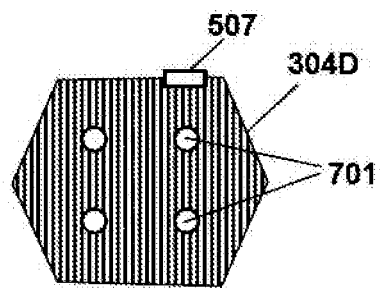
Figure 7C:
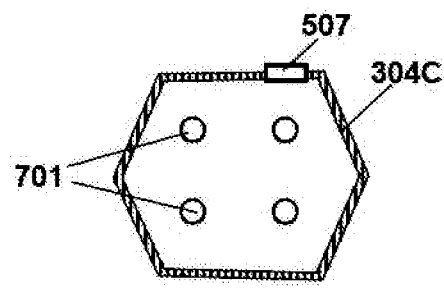
Figure 7C:
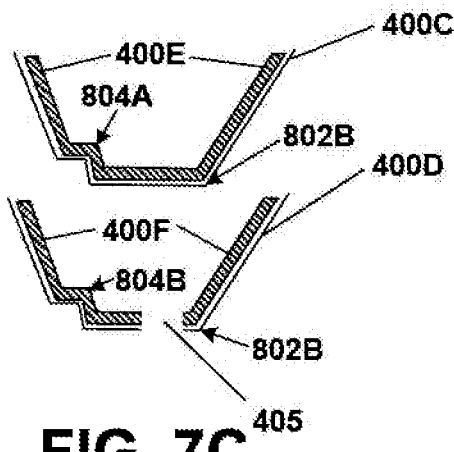

FIG. 7C is a cross-sectional view of a device for forming flexible molds according to another exemplary embodiment.

Referring now to FIG. 7C, this figure illustrates a cross-sectional view of a device 400C, 400D for forming flexible molds 400E, 400F according to an exemplary embodiment. This figure is similar to FIG. 7A1 described above.

The device 400C, 400D may comprise two flexible molds shells that are used to create flexible molds 400E, 400F. The flexible mold shells 400C, 400D may comprise a combination of convex and concave geometries. For example, see convex regions 802A, B and concave regions 804A, B. Additional and/or fewer convex regions 802A, B and concave regions 804A, B may be provided without departing from the scope of this disclosure. Further, these convex regions 802A,B and concave regions 804A,B may be added to all molds described in this disclosure, such as those illustrated in FIG. 7B.

Figure 8:
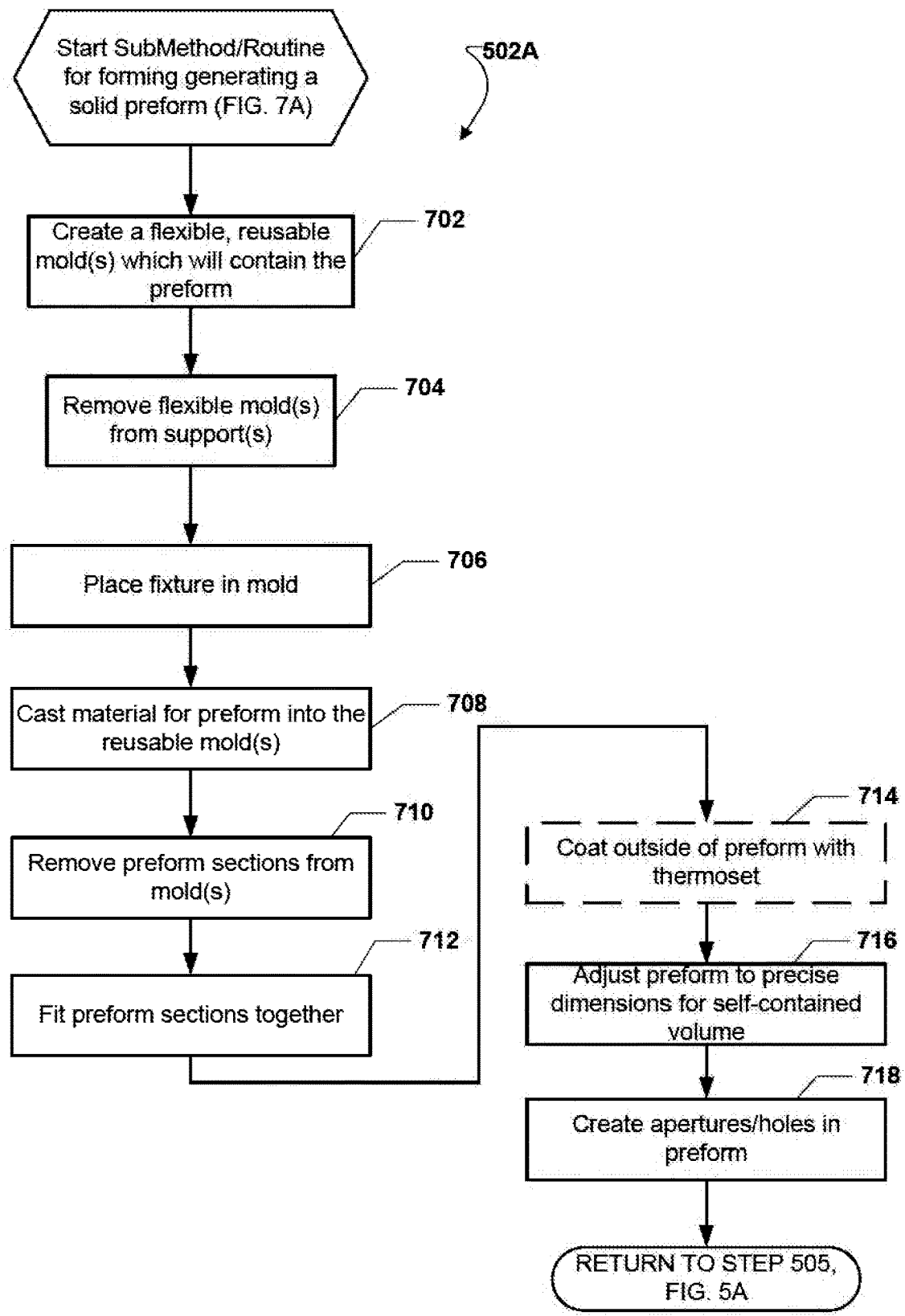
FIG. 8 is a flowchart illustrating a routine or submethod for generating the solid preform of FIG. 7A according to an exemplary embodiment.
Figure 9:
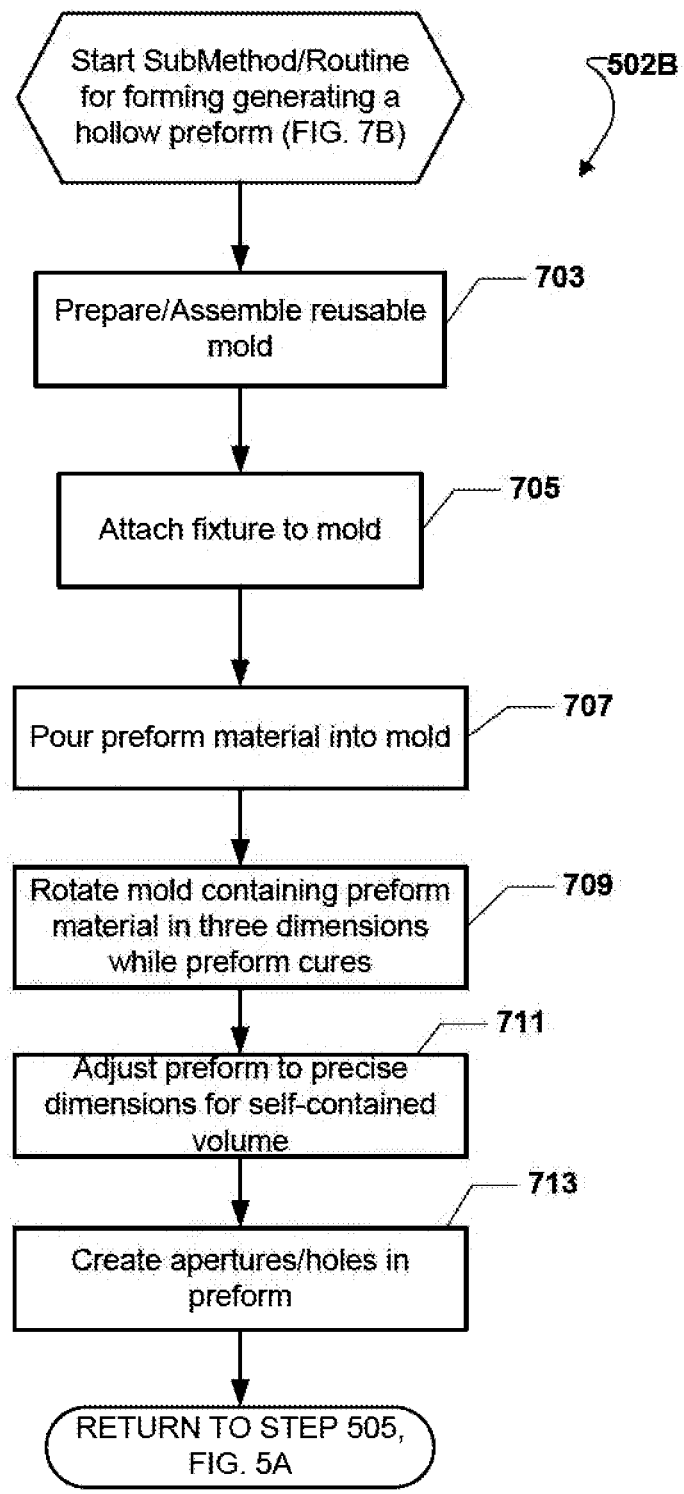
FIG. 9 is a flowchart illustrating a routine or submethod for generating the hollow preform of FIG. 7B according to an exemplary embodiment.

FIG. 8 is a flowchart 502A illustrating a routine or submethod 502A for generating the solid preform 304D of FIG. 7A according to an exemplary embodiment. Block 702 is the first step of routine 502A. This routine 502A corresponds with routine 502 described above in connection with FIG. 5A. As mentioned previously, routine 502 of FIG. 5A may have at least two different paths or methods, such as illustrated in FIG. 8 and FIG. 9.

In block 702 of FIG. 8, a flexible, reusable mold 400E, 400F as illustrated in FIGS. 7A1-A3 is created. The flexible, reusable mold 400E, 400F may be created with the use of supports or mold forms 400C, 400D as set forth in FIG. 7A1. The flexible, reusable mold 400E, 400F, once created, may be used to generate a preform 304.

In block 704, the flexible, reusable mold 400E, 400F is removed from supports 400C, 400D as illustrated in FIG. 7A2. In block 706, a fixture 507 may be positioned within an aperture 405 of a portion of the flexible, reusable mold 400E, 400F, such as in flexible mold 400F as illustrated in FIG. 7A3. The fixture 507 is positioned before the material for the preform 304B hardens.

In block 708, the material for the preform 304 is cast into the flexible, reusable mold 400E, 400F such as illustrated in FIG. 7A3. In block 710, the hardened preform materials forming preform sections 304A, 304B may be removed from the flexible and reusable mold 400E, 400F as illustrated in FIG. 7A4. Next, in block 712, the preform sections 304A, 304B may be fitted together and coupled permanently with the use of adhesives as illustrated in FIG. 7A5.

In optional block 714, the outside of or external layer of the preform 304D may be coated with a thermoset layer as illustrated in FIG. 7A5 with the nozzle 707 dispersing a coating. Next, in block 716, the preform 304D may be adjusted to precise dimensions that will correspond to the self-contained volume 100 described above. Specifically, in this block 716, adjusting may include sanding, buffing, cutting, shaving, and the like, to the preform 304D. Subsequently, in block 716, apertures/holes 701 may be created within the solid, gas-permeable preform 304D. The process then returns to block 505 of FIG. 5A.

FIG. 9 is a flowchart illustrating a routine or submethod for generating the hollow preform 304C of FIG. 7B according to an exemplary embodiment. Block 703 is the first step of routine 502B. This routine 502B corresponds with routine 502 described above in connection with FIG. 5A. As mentioned previously, routine 502 of FIG. 5A may have at least two different paths or methods, such as illustrated in FIG. 8 and FIG. 9.

In block 703 of FIG. 9, the reusable mold 400G, 400H such as illustrated in FIG. 7B1 may be assembled/prepared. This reusable mold 400G, 400H may produce hollow preforms 304C as described above.

In block 705, a fixture 507 may be positioned within the reusable mold 400G, 400H. Specifically, one section 400G of the reusable mold 400G, 400H may have an aperture for receiving a fixture 507.

In block 707, preform material 304C may be poured in a liquid state from a nozzle 509 to the inside of the reusable mold 400G, 400H such as illustrated in FIG. 7B3. Next, in block 709, the reusable mold 400G, 400H may be sealed and then rotated in three dimensions while the liquid preform material 304C cures against the inside or internal wall of the reusable mold 400G, 400H.

In block 711, the hollow, gas-permeable preform 304C may be removed from the reusable mold 400G, 400H. The hollow gas-impermeable preform 304C may be adjusted to precise dimensions corresponding to the self-contained volume 100. Specifically, in this block 711, adjusting may include sanding, buffing, cutting, shaving, and the like, to the preform 304C. Subsequently, in block 713, apertures/holes 701 may be created within the hollow, gas-impermeable preform 304D. The process then returns to block 505 of FIG. 5A.

Elastomeric Material 102—Example 1

100 parts of a polyurethane dispersion such as Dispercoll U42 (which is an aqueous anionic dispersion of a high molecular weight polyurethane) having a solids content of 48-52%, a viscosity of 150-800 cps/mPa·s and a density of approximately 1.1 g/cm$^3$ was spread onto a foam polyurethane preform 304 that had been previously coated with a layer 302 of Smooth On EZ Spray SILICONE® 20 silicone (which is a 20 Shore A silicone elastomer) and a layer of inner liner 202 made from a polysulfide such as PRC Rapid Seal 655 aliphatic polysulfide sold by PRC-DeSoto International, Inc.

Next about a 24 oz NYLON fabric 104B that had been previously coated and dried with a solvated polyurethane, namely Estane 5714, an aliphatic polyurethane, or a polyether type thermoplastic polyurethane, was coated with the same polyurethane dispersion 102D and placed on the preform 304, dispersion side down. This was followed by debulking under vacuum at 83° C. for 180 minutes.

The coating and drying of the nylon fabric 104B with Estane 5714 are optional steps that can be dropped without departing from the scope of this disclosure. Samples of the preform were made for Example 1 without using Estane 5714 or a solvated polyurethane. This dropping of the use of Estane 5714 (or any urethane) was also practiced for Examples 2 and 3 described below.

Another layer of the same polyurethane dispersion 102C was placed on the preform 304 and a layer of partially vulcanized natural rubber having less than about 1% sulfur, forming the sealant layer 106. The sealant was applied followed by adding another layer of the same polyurethane dispersion 102B to the sealant layer 106 and outer 24 oz NYLON fabric 104A. This was followed by debulking under vacuum at 83° C. for 180 minutes.

Next, the fuel tank was placed in one half of a three dimensional mold 400. The second half 400A of the mold was closed onto the first half 400B and the fuel tank 300A, 300B was heated for at least about 20.0 minutes at a temperature of about 149° C. with no air pressure and then heated for an additional 40 minutes at an air pressure of about 20 psi from the gaseous pressure source 403 at a temperature of about 149° C.

Elastomeric Material 102—Example 2

100 parts of a polyurethane dispersion such as Dispercoll U42 (which is an aqueous anionic dispersion of a high molecular weight polyurethane) having a solids content of 48-52%, a viscosity of 150-800 cps/mPa·s and a density of approximately 1.1 g/cm$^3$ was premixed with 5 parts of a water dispersible polyisocyanate such as Bayhydur 302 (which is a water dispersible polyisocyanate based on hexmethylene diisocyanate).

This dispersion layer 102D was spread onto a foam polyurethane preform 304 that had been previously coated with a layer 302 of Smooth On EZ Spray SILICONE® 20 silicone (which is a 20 Shore A silicone elastomer) and a layer of inner liner 202 made from a polysulfide such as PRC Rapid Seal 655 aliphatic polysulfide sold by PRC-DeSoto International, Inc.

Next about a 24 oz NYLON fabric 104B that had been previously coated and dried with a solvated polyurethane, namely Estane 5714, an aliphatic polyurethane, or a polyether type thermoplastic polyurethane (as noted previously, coating and drying with a urethane is an optional step), was coated with the same polyurethane dispersion 102D and placed on the preform 304, dispersion side down. This was followed by debulking under vacuum at 83° C. for 180 minutes.

Another layer of the same polyurethane dispersion 102C was placed on the preform 304 and a layer of partially vulcanized natural rubber having less than about 1% sulfur, forming the sealant layer 106. The sealant was applied followed by adding another layer of the same polyurethane dispersion 102B to the sealant layer 106 and outer 24 oz NYLON fabric 104A. This was followed by debulking under vacuum at 83° C. for 180 minutes.

Next, the preform was placed in one half of a three dimensional mold 400. The second half 400A of the mold was closed onto the first half 400B and the fuel tank 300A, 300B was heated for at least about 20.0 minutes at a temperature of about 149° C. with no air pressure and then heated for an additional 40 minutes at an air pressure of about 20 psi from the gaseous pressure source 403 at a temperature of about 149° C.

Elastomeric Material 102—Example 3

100 parts of a polyurethane dispersion such as Dispercoll U42 (which is an aqueous anionic dispersion of a high molecular weight polyurethane) having a solids content of 48-52%, a viscosity of 150-800 cps/mPa·s and a density of approximately 1.1 g/cm$^3$ was premixed with 5 parts of a water dispersible polyisocyanate such as Bayhydur 302 (which is a water dispersible polyisocyanate based on hexmethylene diisocyanate). This was applied to all 24 oz Nylon fabric 104 used in wall structure 100 that had been previously coated and dried with a solvated polyurethane, namely Estane 5714, an aliphatic polyurethane, or a polyether type thermoplastic polyurethane (but as noted previously, coating and drying with a urethane is an optional step). The polyurethane dispersion was cured for 60 minutes at 100° C.

100 parts of a polyurethane dispersion such as Dispercoll U42 (which is an aqueous anionic dispersion of a high molecular weight polyurethane) having a solids content of 48-52%, a viscosity of 150-800 cps/mPa·s and a density of approximately 1.1 g/cm$^3$ was spread onto a foam polyurethane preform 304 that had been previously coated with a layer 302 of Smooth On EZ Spray SILICONE® 20 silicone (which is a 20 Shore A silicone elastomer) and a layer of inner liner 202 made from a polysulfide such as PRC Rapid Seal 655 aliphatic polysulfide sold by PRC-DeSoto International, Inc.

Next about a 24 oz NYLON fabric 104B was coated with the same polyurethane dispersion 102D and placed on the preform 304, dispersion side down. This was followed by debulking under vacuum at 83° C. for 180 minutes.

Another layer of the same polyurethane dispersion 102C was placed on the preform 304 and a layer of partially vulcanized natural rubber having less than about 1% sulfur, forming the sealant layer 106. The sealant was applied followed by adding another layer of the same polyurethane dispersion 102B to the sealant layer 106 and outer 24 oz NYLON fabric 104A. This was followed by debulking under vacuum at 83° C. for 180 minutes.

Next, the fuel tank was placed in one half of a three dimensional mold 400. The second half 400A of the mold was closed onto the first half 400B and the fuel tank 300A, 300B was heated for at least about 20.0 minutes at a temperature of about 149° C. with no air pressure and then heated for an additional 40 minutes at an air pressure of about 20 psi from the gaseous pressure source 403 at a temperature of about 149° C.

Certain steps in the processes or process flows described in this specification naturally precede others for the invention to function as described. However, the invention is not limited to the order of the steps described if such order or sequence does not alter the functionality of the invention. That is, it is recognized that some steps may preformed before, after, or parallel (substantially simultaneously with) other steps without departing from the scope and spirit of the invention.

For example, in an alternative exemplary embodiment, the urethane dispersion 102 may be applied according to the following sequence: to the inner liner 202, similar to step 525; then, the elastomeric material 102 may be applied to the fabric layer 104; then the fabric layer 104 may then be applied to the inner liner 202, similar to step 525; then the elastomeric material 102 may be applied to the fabric layer 104 again; then, the sealant layer 106 may be applied, similar to step 545; and then, the polyurethane dispersion 102 may be applied to a second fabric layer 104.

In some instances, certain steps may be omitted or not preformed without departing from the invention. Further, words such as "thereafter", "then", "next", etc. are not intended to limit the order of the steps. These words are simply used to guide the reader through the description of the exemplary method.

As noted previously, at least one inventive aspect of the inventive system and method is that the preform 304 is inflated during cure of the elastomeric material included in layer 100. With this inflation of the preform 304, the wall system 200 conforms to the exact dimensions of the mold 400 which holds the preform 304 and the wall system 200 sandwiched there between. This process yields a dimensionally correct/precisely built self-sealing volume 200.

According to an additional exemplary embodiment, a first barrier layer (not illustrated) may be provided between the liner 202 and the sealant 106. The purpose of the barrier layer is to limit the permeation of fuel 204 over time through the inner liner layer 202, the elastomeric material layer 102D, the fabric layer 104B, and the elastomeric material layer 102C. A second barrier layer, like the first barrier layer (both not illustrated) may also be provided on the exterior of the self-sealing volume 200 to also limit fuel permeation from fuel 204 that may come in contact with the volume 200, such as through a spill or leak from another volume or source.

Although selected aspects have been illustrated and described in detail, it will be understood that various substitutions and alterations may be made therein without departing from the spirit and scope of the present invention, as defined by the following claims.

What is claimed is:

1. A method for making a self-sealing volume, the method comprising:
   coating an inflatable preform with a material for forming the self-sealing volume and for forming one or more passages that allow for the escape of a fluid, the material comprising an elastomeric material dispersed or dissolved in a liquid medium;
   placing the preform having the material into a mold;
   inflating the material against the mold with the fluid;
   allowing the fluid to escape through the one or more passages; and
   curing the material with the mold to form the self-sealing volume.

2. The method of claim 1, wherein the elastomeric material comprises at least one of polyurethanes, polyureas, polyurethane ureas, epoxy, polyester, and silicones.

3. The method of claim 1, wherein the elastomeric material comprises a polyurethane dispersion layer.

4. The method of claim 3, wherein the polyurethane dispersion layer comprise an aqueous anionic dispersion of polyurethane with a molecular weight of at least about 335,000.00.

5. The method of claim 1, wherein the material comprises fabrics made from at least one of nylon, polyester, polypropylene, polyethylene and an aramid.

6. The method of claim 1, wherein the material comprises at least one of a sealant calendared onto a fabric and a sealant calendared between two layers of fabric.

7. The method of claim 1, wherein the one or more passages are positioned in at least one of a corner of the self-sealing volume, and a side of the self-sealing volume.

* * * * *